(12) United States Patent
Grajek et al.

(10) Patent No.: US 10,419,418 B2
(45) Date of Patent: *Sep. 17, 2019

(54) DEVICE FINGERPRINT BASED AUTHENTICATION

(71) Applicant: SecureAuth Corporation, Irvine, CA (US)

(72) Inventors: Garret Florian Grajek, Aliso Viejo, CA (US); Chihwei Liu, Irvine, CA (US); Allen Yu Quach, Rosemead, CA (US); Jeffrey Chiwai Lo, Irvine, CA (US)

(73) Assignee: SecureAuth Corporation, Irvine, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/718,944

(22) Filed: Sep. 28, 2017

(65) Prior Publication Data

US 2018/0124039 A1    May 3, 2018

Related U.S. Application Data

(63) Continuation of application No. 14/621,826, filed on Feb. 13, 2015, now Pat. No. 9,781,097.

(Continued)

(51) Int. Cl.
*H04L 29/06* (2006.01)
*H04L 29/08* (2006.01)
*G06F 21/64* (2013.01)

(52) U.S. Cl.
CPC .......... *H04L 63/0815* (2013.01); *G06F 21/64* (2013.01); *H04L 63/0807* (2013.01);
(Continued)

(58) Field of Classification Search
None
See application file for complete search history.

(56) References Cited

U.S. PATENT DOCUMENTS 8,001,582 B2 * 8/2011 Hulten .................. H04L 63/102
726/3
8,392,712 B1 * 3/2013 Wilson .................... H04L 63/08
713/175

(Continued)

FOREIGN PATENT DOCUMENTS

EP   1368722 B1   8/2007
GB   2434724      8/2007

OTHER PUBLICATIONS

Allan et al., "Magic Quadrant for User Authentication", Gartner ID: 600260746, Dec. 2014 (of-record in parent application).

(Continued)

*Primary Examiner* — Piotr Poltorak
(74) *Attorney, Agent, or Firm* — Knobbe, Martens, Olson & Bear, LLP

(57) ABSTRACT

A device fingerprinting system provides an additional factor of authentication. A user device may be redirected, along with user ID parameters, to authentication system. The user device may be sent instructions to execute that collect and send back device characteristic information to the authentication system. The authentication can create a unique fingerprint of the device, and determine if the fingerprint has been seen before. If seen before, the authentication system may send back an authentication token indicating the additional factor of authentication was a success. If the fingerprint has not been seen previously, the authentication system may conduct a one-time password authentication as the additional factor. If successful, the fingerprint may be stored in association with the user device for future authentication as an additional factor.

16 Claims, 13 Drawing Sheets

Related U.S. Application Data

(60) Provisional application No. 61/941,286, filed on Feb. 18, 2014.

(52) U.S. Cl.
CPC ...... *H04L 63/0838* (2013.01); *H04L 63/0876* (2013.01); *H04L 67/02* (2013.01); *H04L 67/10* (2013.01); *H04L 67/125* (2013.01); *H04L 67/2814* (2013.01); *H04L 2463/082* (2013.01)

(56) References Cited

U.S. PATENT DOCUMENTS

| | | | |
|---|---|---|---|
| 8,613,067 B2 | 12/2013 | Lambiase et al. | |
| 8,677,116 B1 | 3/2014 | Bicer | |
| 8,739,278 B2 | 5/2014 | Varghese | |
| 8,819,803 B1 | 8/2014 | Richards et al. | |
| 8,893,255 B1 | 11/2014 | Martini | |
| 8,898,450 B2 | 11/2014 | Harjanto et al. | |
| 8,966,603 B2 | 2/2015 | Agarwal | |
| 9,032,217 B1* | 5/2015 | Brandwine | G06F 21/44 713/185 |
| 9,124,583 B1 | 9/2015 | Amaladoss et al. | |
| 9,237,146 B1 | 1/2016 | Casillas et al. | |
| 9,319,419 B2* | 4/2016 | Sprague | H04L 63/0876 |
| 9,781,097 B2 | 10/2017 | Grajek et al. | |
| 2002/0073046 A1 | 6/2002 | David | |
| 2002/0157090 A1 | 10/2002 | Anton, Jr. | |
| 2003/0005306 A1* | 1/2003 | Hunt | G06F 17/30174 713/181 |
| 2004/0083394 A1* | 4/2004 | Brebner | G06F 21/31 726/19 |
| 2004/0199775 A1* | 10/2004 | Ser | G06K 9/00067 713/186 |
| 2005/0033994 A1* | 2/2005 | Suzuki | H04L 63/083 726/19 |
| 2005/0249145 A1* | 11/2005 | Wilson | H04B 7/18582 370/316 |
| 2006/0185021 A1 | 8/2006 | Dujari | |
| 2006/0282660 A1* | 12/2006 | Varghese | G06Q 20/341 713/155 |
| 2007/0115494 A1* | 5/2007 | Nakayama | G06F 21/608 358/1.14 |
| 2007/0170238 A1 | 7/2007 | Piersol et al. | |
| 2007/0234409 A1 | 10/2007 | Eisen | |
| 2007/0287450 A1 | 12/2007 | Yang et al. | |
| 2008/0040271 A1* | 2/2008 | Hammad | G06Q 20/085 705/41 |
| 2008/0120707 A1 | 5/2008 | Ramia | |
| 2009/0064290 A1 | 3/2009 | Norman et al. | |
| 2009/0089869 A1* | 4/2009 | Varghese | G06F 21/31 726/7 |
| 2010/0107225 A1* | 4/2010 | Spencer | H04L 63/0876 726/4 |
| 2010/0217975 A1 | 8/2010 | Grajek et al. | |
| 2010/0251347 A1 | 9/2010 | Roskind | |
| 2011/0016327 A1* | 1/2011 | Suzuki | G06F 21/32 713/186 |
| 2012/0023565 A1 | 1/2012 | Tumanyan | |
| 2012/0084203 A1 | 4/2012 | Mehew et al. | |
| 2012/0084206 A1* | 4/2012 | Mehew | G06Q 40/00 705/44 |
| 2012/0144450 A1* | 6/2012 | Pai | H04L 9/321 726/3 |
| 2012/0185925 A1 | 7/2012 | Barkie et al. | |
| 2012/0192277 A1* | 7/2012 | Jakobsson | G06F 21/31 726/24 |
| 2012/0215896 A1 | 8/2012 | Johannsen | |
| 2012/0317622 A1 | 12/2012 | Harjanto et al. | |
| 2012/0323717 A1* | 12/2012 | Kirsch | G06Q 20/0855 705/26.1 |
| 2013/0117214 A1* | 5/2013 | Davis | G06N 5/02 706/46 |
| 2013/0125226 A1 | 5/2013 | Shah et al. | |
| 2013/0167196 A1* | 6/2013 | Spencer | H04W 8/22 726/3 |
| 2013/0191929 A1 | 7/2013 | Yin et al. | |
| 2013/0283398 A1* | 10/2013 | Wu | G06F 21/60 726/28 |
| 2013/0288647 A1* | 10/2013 | Turgeman | H04W 12/06 455/411 |
| 2013/0340052 A1 | 12/2013 | Jakobsson | |
| 2014/0020073 A1* | 1/2014 | Ronda | G06F 21/31 726/7 |
| 2014/0066015 A1 | 3/2014 | Aissi | |
| 2014/0090041 A1 | 3/2014 | Kim et al. | |
| 2014/0173700 A1 | 6/2014 | Awan et al. | |
| 2014/0189843 A1 | 7/2014 | Francisco et al. | |
| 2014/0250490 A1 | 9/2014 | Baca et al. | |
| 2014/0258529 A1* | 9/2014 | Etchegoyen | G06Q 30/0277 709/225 |
| 2014/0365780 A1 | 12/2014 | Movassaghi | |
| 2014/0369335 A1 | 12/2014 | Mansour | |
| 2014/0380053 A1 | 12/2014 | Libonate et al. | |
| 2015/0089568 A1* | 3/2015 | Sprague | H04L 63/0876 726/1 |
| 2015/0106900 A1 | 4/2015 | Pinski et al. | |
| 2015/0128231 A1 | 5/2015 | Nakajima | |
| 2015/0128241 A1 | 5/2015 | Jakobsson | |
| 2015/0215297 A1 | 7/2015 | Rathodi et al. | |
| 2015/0242605 A1 | 8/2015 | Du et al. | |
| 2015/0317471 A1 | 11/2015 | Baentsch et al. | |
| 2016/0094529 A1 | 3/2016 | Mityagin | |
| 2017/0024763 A1* | 1/2017 | Liu | H04L 63/0876 |

OTHER PUBLICATIONS

UBrown, "Authenticated Guest User Web Page Redirect Based Upon Username Login ID", Airheads community, May 2011, (of-record in parent application).

SecureAuth, "SecureAuth Lauches Device Fingerprinting Authentication for Stronger BYOD Security and Bettter User Experience", Yahoo Finance May 2013 (of-record in parent application).

Secure Auth1, "Secure Auth Launches Device Fingerprinting Authenticaiton for Stronger BYOD", Secure Auth May 2013 (of-record in parent application).

* cited by examiner

| | | | |
|---|---|---|---|
| UserID: | user03 | Get User | Logout | (1)

Given Name: 
Surname: 
Phone 1: 
Phone 2: 
Phone 3: 
Phone 4: 
Email 1: 
Email 2: 
Email 3: 
Email 4:

☐ Clear the users Knowledge Based Answers

Challenge Question:
User's Answer:

Cert Count: 1
Dynamic Cert Validation Date: ☐ ☐ ☐ ☐ ☐
28

Digital Fingerprints (Uncheck to revoke)
- ☑ OS X 10.8 Mountain Lion - Safari 6.0.5: 9/10/2013 3:04:58 PM
- ☑ Windows Phone 8 - IE Mobile 10.0: 9/10/2013 2:03:08 PM
- ☑ Windows Phone 7 - IE Mobile 9.0: 9/4/2013 4:15:59 PM
- ☑ Windows 7 - Chrome 29.0.1547.62: 9/4/2013 1:43:12 PM
- ☑ Windows 7 - Firefox 21.0: 8/28/2013 3:49:48 PM
- ☑ Windows 7 - IE 10.0: 8/21/2013 6:11:20 PM
- ☑ Windows 7 - IE 10.0: 8/21/2013 6:06:43 PM
- ☑ Windows 7 - Chrome 30.0.1599.66: 8/1/2013 3:56:31 PM
- ☑ Windows 7 - IE 10.0: 8/1/2013 4:05:14 PM (2)

Reset Fingerprints

Reset All Registrations

Update

FIG. 8A https://demoportal.secureauth.com/config

Cert Count: 1
Dynamic Cert Validation Date: [ ] [ ] [ ] [ ] [ ]
28

Digital Fingerprints (Uncheck to revoke) (1)
- ☐ OS X 10.8 Mountain Lion - Safari 6.0.5: 9/10/2013 3:04:58 PM
- ☑ Windows Phone 8 - IE Mobile 10.0: 9/10/2013 2:03:08 PM
- ☑ Windows Phone 7 - IE Mobile 9.0: 9/4/2013 4:15:59 PM
- ☑ Windows 7 - Chrome 29.0.1547.62: 9/4/2013 1:43:12 PM
- ☑ Windows 7 - Firefox 21.0: 8/28/2013 3:49:48 PM
- ☑ Windows 7 - IE 10.0: 8/21/2013 6:11:20 PM
- ☑ Windows 7 - IE 10.0: 8/21/2013 6:06:43 PM
- ☑ Windows 7 - Chrome 30.0.1599.66: 8/1/2013 3:56:31 PM
- ☑ Windows 7 - IE 10.0: 8/1/2013 4:05:14 PM

[ Reset Fingerprints ] (2)

[ Reset All Registrations ]

( Update )

DEVICE FINGERPRINT BASED AUTHENTICATION

CROSS-REFERENCE TO RELATED APPLICATIONS

This application is a continuation of U.S. patent application Ser. No. 14/621,826, entitled "DEVICE FINGERPRINT UPDATING FOR SINGLE SIGN ON AUTHENTICATION" and filed on Feb. 13, 2015, which claims the benefit of U.S. Provisional Application No. 61/941,286 entitled "FINGERPRINT BASED MULTIFACTOR AUTHENTICATION FOR SINGLE SIGN ON," filed Feb. 18, 2014. The entire disclosures of the aforesaid applications are hereby incorporated by reference herein.

TECHNICAL FIELD

The present disclosure relates to systems and techniques for authentication. More specifically, the disclosure relates to providing multifactor authentication and single-sign-on for users and their devices based on device fingerprinting.

BACKGROUND

Single factors of authentication by themselves can have security issues. For example, if a hacker acquires a user's password, then the hacker may be able to gain access to other network resources for which the user has registered the same password for authentication. Therefore, to increase security, many enterprise applications, cloud applications, mobile applications, and other networked resources require more than one factor of authentication. For example, in addition to a username and password, a network resource may require the user to authenticate with a second factor of authentication, such as a one-time password, a digital signature based on a certificate, etc.

When two or more factors of authentication are required, a hacker has more difficulty acquiring all of the information necessary to access a user's network resources. However, multi-factor authentication is typically more burdensome for users.

SUMMARY

In one embodiment, a computerized fingerprint-based authentication system comprises: one or more hardware processors configured to cause the authentication system to: receive, over a network, a request for authentication of a user computing device associated with a user, the request resulting from a redirection operation sent to the user computing device; communicate a one-time password to the user for an initial authentication; receive, over the network, the one-time password from the user computing device; send, over the network, to the user computing device capture instructions, the capture instructions configured to cause the user computing device to collect a plurality of characteristic values of the user computing device, the plurality of the characteristic values representing at least two attributes of the user computing device; receive, over the network, the plurality of characteristic values of the user computing device; create a device fingerprint value associated with the user computing device based on the plurality of characteristics of the user computing device; store the device fingerprint value and the plurality of characteristics in data storage; and transmit an authentication token to the user computing device, the authentication token indicating that the user computing device has been authenticated by a fingerprinting mechanism.

In one embodiment, a computerized fingerprint-based authentication system comprises: one or more hardware processors configured to cause the authentication system to: receive, over a network, a request for authentication by a user computing device associated with a user, the request resulting from a redirection operation sent to the user computing device from a network service requiring additional authentication of the user in addition to a password; send, over the network, to the user computing device capture instructions, the capture instructions configured to cause the user computing device to collect a plurality of characteristic values of the user computing device, the plurality of the characteristic values representing at least two attributes of the user computing device; receive, over the network, the plurality of characteristic values of the user computing device; generate a device fingerprint value associated with the user computing device based on the plurality of characteristic values of the user computing device; access a second device fingerprint value associated with the user computing device; compare the device fingerprint value to the second device fingerprint value and determine if the comparison of the device fingerprint value and the second device fingerprint value indicates that the user computing device has been previously registered with the computerized fingerprint-based authentication system; and when a determination is made that the user computing device has been previously registered with the computerized fingerprint-based authentication system, transmit an authentication token to the user computing device, the authentication token indicating that the user computing device was authenticated by a fingerprinting mechanism.

In one embodiment, a computerized fingerprint-based authentication system comprises: one or more hardware processors configured to cause the fingerprint-based authentication system to: receive, over a network, a request for authentication of a user computing device associated with a user, the request resulting from a redirection operation sent to the user computing device from a network service requiring additional authentication in addition to a password; send, over the network, to the user computing device, capture instructions, the capture instructions configured to cause the user computing device to collect a first plurality of characteristic values of the user computing device, the first plurality of the characteristic values representing at least two attributes of the user computing device; receive, over the network, the first plurality of characteristic values of the user computing device; compare the first plurality of characteristic values of the user computing device to a second plurality of characteristic values, the second plurality of characteristic values previously stored by the computerized fingerprint-based authentication system; determine a device certainty score based on a comparison of the first plurality of characteristic values of the user computing device to the second plurality of characteristic values; and when a determination is made that the device certainty score is above a threshold update score: update the second plurality of characteristic values in data storage to include the first plurality of characteristic values, and transmit an authentication token to the user computing device, the authentication token indicating that the user computing device was authenticated by a fingerprinting mechanism.

BRIEF DESCRIPTION OF DRAWINGS

Throughout the drawings, reference numbers may be re-used to indicate correspondence between referenced elements. The drawings are provided to illustrate example embodiments described herein and are not intended to limit the scope of the disclosure.

FIG. 8A is an illustrative, web-based user interface of a fingerprint management and/or revocation interface, as described in some embodiments.

FIG. 8B is an illustrative web-based user interface of a fingerprint management and/or revocation interface, as described in some embodiments.

FIG. 10 is an illustrative, web-based user interface to configure match score and update score configuration settings, as described in some embodiments.

DETAILED DESCRIPTION OF SPECIFIC EMBODIMENTS

Figure 1:
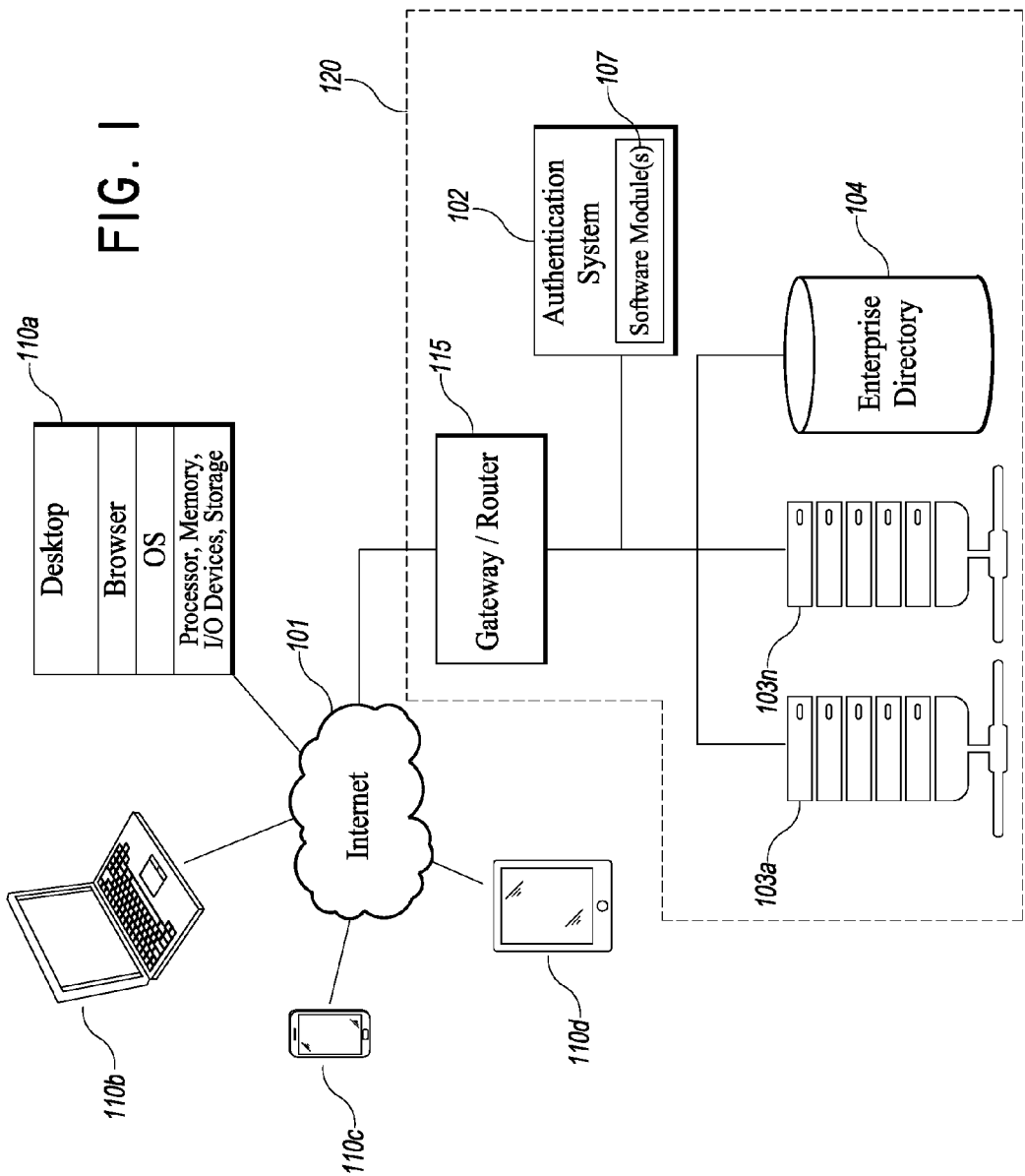
FIG. 1 is a block diagram of illustrative network(s) including multiple user computing devices, multiple services and servers, and authentication mechanisms, as described in some embodiments.

Introduction to Fingerprinting as an Additional Factor of Authentication

The present disclosure is directed to providing single sign-on, multiple factor authentication for user computing devices and their users. Specifically, the disclosure relates to a single sign-on process in which browsers, mobile applications, etc., may initially register a user device fingerprint using an additional factor of authentication that may require user interaction (such as a one-time password or knowledge based authentication). This fingerprint, which is stored in association with a particular user, may then be used as an additional authentication factor in the future in lieu of additional authentication factors that require user interaction (for example, so that user interaction is not required), without having to issue digital certificates.

For example, in some embodiments, a user may initially browse to an enterprise's web resource, app resource, or other network resource. For instance, the user may point his web browser to an enterprise's web-based portal to access a web-based email system on an enterprise's web server. The enterprise's web server may authenticate the user, using a username and password, and check the username and password credentials against the enterprise's directory.

After the user initially authenticates to the enterprise's web server with a username and password (i.e. a first authentication factor), the web server may redirect the user's browser running on the user computing device to a cloud based or other system that will require an additional authentication factor. Successful authentication with this additional authentication factor may be required prior to the user accessing the web-based email service. This redirect may be performed using standard W3C methods, and may include, in the redirect, user ID and other contact information such as an email address or mobile phone number.

The cloud based system (e.g. the authentication system or devices) may then use this user ID, email address, and/or mobile phone number to register the user computing device the user is currently using. For example, the cloud based system may now further authenticate the user using the contact information, such as by sending to the email address a generated one-time password or link, or by SMS texting to the mobile phone the generated password one-time password, etc. The user may then, by clicking on the link in his email, or typing in the one-time password via the authentication system's web interface, send the one-time password to the cloud based authentication system. At this point, the one-time password sent by the user can be compared to the one generated by the cloud based authentication system.

If they match, the system may send a device characteristic capture script to the user's device to capture information about the device, such as HTTP header information, identifiers of browser plug-ins, networking addresses, screen size and/or resolution, HTML5 session storage information, Internet Explorer User Data Support information, Browser Cookie enable/disable settings, a time zone, and/or other information. After gathering this information, the capture script may instruct the user's device to send this information back to the authentication system. The authentication system may then create a hash (such as by using MD5, SHA-1, SHA-256, SHA-3, HAVAL, and/or another hash algorithm) over all of the received device characteristics. This fingerprint of the device is then stored in the authentication system's storage in association with the user ID, along with the device's characteristic values. The user device may then receive an authentication token provided by the authentication system, such as a cookie or redirect URL parameter (in plain text or encrypted), that may be returned to the enterprise's web service indicating that the user device performed the additional authentication factor.

In the future, when the user and his/her user device attempt to access the same enterprise web server (or a different enterprise web/app server), the web server may then again redirect the user's device, after the user has authenticated with a username/password, to the authentication system, again, transferring in the redirect a user ID and other contact information. The authentication system may then gather device characteristics using the capture script in the same manner, and calculate a new device fingerprint. The authentication system may then look up the user's associated stored device fingerprints by the received user ID. If that fingerprint matches any of the stored fingerprints, the device is considered to have authenticated with an additional factor of authentication without any input required from the user (e.g. no one-time password interaction required, etc.). The user device may then again receive an authentication token, such as a cookie or redirect URL parameter (in plain text or encrypted), that may be returned to the enterprise's web service indicating that the user device performed the additional authentication factor.

In this way, the fingerprint created on the fly for each device may be compared to past stored fingerprints on a per user basis. This "fingerprint" comparison may be considered an additional factor of authentication going forward, and may be used in lieu of (or in addition to) a user-interaction based, or certificate based, additional factor of authentication.

Network and System Overview

FIG. 1 illustrates an example network and its connected system(s)/devices that may perform the methods described herein. Network 101, which could be the Internet or any wide area network or local area network, may connect user computing devices 110a, 110b, 110c, 110d, which are illustrated here as examples of a variety of user computing devices (often referred to as user computing device 110 or user device 110 as representing one of these types of devices). These types of devices may access authentication system 102 for authentication. For example, desktop 110a may comprise an Internet browser (such as a web browser—Chrome, Safari, Internet Explorer, Firefox, etc.), an operating system, (such as Windows 7/8, OS X, Linux, Android, IOS, etc.), as software, and may also comprise hardware processors and memory and I/O devices. The hardware processor(s) may execute program instructions that are stored in memory and/or other data storage such as a hard drive or solid state disk. Other I/O devices may include a display, a network connectivity device, such as a network card (e.g. Ethernet card, 802.11a/b/g/n, etc.), that may send and receive packets. Such packets may be IP packets that are transmittable over the Internet, such as Internet 101. Other I/O devices may be a keyboard and mouse that allow for user input, and a display that allows for information to be displayed by the computer as dictated by the computer programs.

Similarly, laptop 110b, smartphone 110c, tablet 110d, or any kind of user computing device may have a similar browser, operating system, and hardware that may execute programmatic instructions such as one or more processors and memory and other storage devices to store those instructions. They may also have similar I/O devices such as displays, keyboards or mice, touchscreens allowing for touch input interfaces, or network cards.

These user devices may individually or collectively communicate with a number of other computing devices connected to the Internet. For example, they may communicate with any of the devices that are within network 120. Network 120 in this example illustrates a simple enterprise network that may consist of a gateway router 115 that may act as a border router at an ingress or egress point to network 120. Network 120 may also comprise an authentication system or system 102 which, like desktop 110a, may also comprise one or more hardware processors, memory and storage devices that may store programmatic instructions executable by the hardware processors to carry out methods described herein. The authentication system 102 (or "authentication server" or "authentication service") may be implemented by one or more distinct authentication systems.

Authentication system 102 may also comprise one or more user interfaces. Such user interfaces may be displayed over the web and may be interactive with a display located over the network such as the display on user computing device 110. Such a network/web user interface may include one or more web pages, or one or more web page plugins that can collect information in a web-based form. This information may then be sent by the browser back to the authentication system for processing. These user interfaces may be used to, for example, configure authentication system 102 and/or for authentication or authorization of user computing devices 110a, 110b, 110c, 110d or any user of those user computing devices. For example, as described herein, user computing device 110 may contact over the web authentication system 102 to provide one or more pieces of information used for authentication, and vice versa.

For example, authentication system 102 may send to desktop 110a a webpage where a user may enter information into an input form field. In some embodiments, this information may be a device selection indicating revocation, and may revoke a device from the list of registered fingerprinted devices associated with a user ID. Similarly, over the web, desktop 110a may send to authentication system 102 information from a redirect request, information containing a one-time password, information about fingerprint characteristics of the device, or information in response to any request from authentication system 102. This list is exemplary and is not meant to be limiting. It is only an example of how web-based messages may be transmitted from user computing device 110 to authentication system 102 and vice versa. These communications usually traverse the Internet 101 over the Internet's IP network, or any other any wide area network (usually traversing multiple local area networks), and typically enter enterprise network 120 through gateway router 115 to be routed to authentication system 102. Alternatively, a local area network may be the only network the traffic traverses. The various web user interfaces and web programs described herein may be implemented via software modules on authentication systems, such as software modules 107. These software modules may be executed by hardware processors and stored as instructions on data storage devices such as enterprise directory 104, or any other local data storage device or remote data storage device that is associated with authentication system 102. Such instructions from the software modules may be executed by authentication system 102's one or more hardware processors to implement the system and methods herein.

Enterprise network 120 may comprise a gateway router 115, authentication system 102, webserver 103a, app server 103n, and enterprise directory 104. Enterprise network 120 may also comprise enterprise directory 104. This enterprise directory may comprise, for example, an LDAP, SQL or active directory server that stores information about users associated with enterprise network 120, which in some examples may belongs to a business or organization. The enterprise directory 104 may store information such as user IDs, user passwords, device IDs affiliated with user IDs, addressing information such as city, state, and street address, phone numbers such as mobile and textable (SMS) phone numbers or landline phone numbers, company IDs or email addresses or any other information, characteristic, or attribute associated with the users of the user devices. Enterprise directory 104 may also be used to store authentication or authorization information of the users of the user devices 110s.

Web server 103a may be a network or web service that may be desired to be accessed by of user devices 110. The web server, like normal web servers, may communicate via HTTP over the World Wide Web with user devices and may communicate over, for example, secure HTTP/TLS/SSL, such as HTTPS. Similarly, authentication system 102 may also communicate via HTTP or via HTTPS with user devices 110. For example, if a user of user device 110 desires to access the Salesforce application provided by the organization affiliated with network 120, web server 103a may send information to the device's browser in order to serve that Salesforce application to user device 110. In one example, the Salesforce application may be running on app server 103n, which may be configured to communicate over FTP, Telnet, or any other specific type of communication protocol or application service that is outside of HTTP or other World Wide Web protocols. In this way, app server 103n or web server 103a might provide a variety of network services. When a specific network service is required, such as Salesforce™ provided by web server 103a, authentication of the user and/or the user device 110a may be required before providing that network service or upon access of specific resources where authentication is required. Such authentication may be provided by authentication system 102.

In particular, when Salesforce, for example, or any other resource provided by any app server or web server within an organization's network, is required then authentication by the authentication system may take place. In addition, authentication system 102 may provide more than simple authentication mechanisms. For example, authentication system 102 may provide multifactor authentication where more than one factor of authentication is required in order to prove that the user is who they claim to be and be authorized to access, for example, web server 103a or any application running on app server 103n. As detailed herein, web server 103a or app server 103n may redirect requests coming from user devices 110 to authentication system 102 for authentication and/or for authentication of an additional factor.

For example, web server 103a may itself require desktop 110a and the user of desktop 110a to be authenticated. For example, the user may log in via the web application running on web server 103a using the username and password affiliated with the enterprise directory 104 (or a username/password local to the web server). Once this username and password is authenticated, web server 103a may require additional authentication and may redirect the web request to the authentication system for the additional authentication using an additional factor. Such additional factors may, for example, be a one-time password (OTP), a fingerprint, a certificate based mechanism (e.g. a cryptographic private key signature), among other additional factors. These additional factors may also include any knowledge-based questions and answers type factors, for example, "what is the name of your first pet?", where the answer is configurable by the user.

FIG. 1 illustrates a solution for a web browser to facilitate device registration, validation and revocation for the purpose of secure two-factor authentication for IT resources, such as any enterprise web applications running on a web server 103a and any network resources running on an app server 103n. In this disclosure, any reference to communications or interactions with a web server 103a may alternatively be implemented in non-web based protocols for other types of non-web network resources (e.g., email, such as applications as deployed on enterprise app server 103n).

The entire process for such additional two-factor authentication may be manageable and configurable by an administrative console, such as configuration web pages hosted by the authentication system 102. The entire process may be logged and such logs may be viewable on authentication system 102 either through the web or through a local display. As another example, registered device fingerprints may be managed and revoked by users and administrators via web configuration pages implemented on authentication system 102. In some embodiments, such user interfaces for configuration and viewing of current authentications may be implemented separately from the authentication system on devices that may access web information coming from authentication system 102, such as any user computing device (e.g. via the web, or via a custom mobile app).

The system described in FIG. 1 may also have the ability to extract distinct device information from a device utilizing web browser and web-based mechanisms such as Javascript. Other mechanisms may be used to extract distinct device information such as flash programs, cookies, custom downloaded and installed programs (hat is downloaded and installed through the web from the authentication system for example), or any other mechanism or instructions that may be transmitted from the authentication system to the user device 110 for collection of characteristic information about the user device, its browser, its software (e.g. OS or other applications), or its user. This characteristic information may be transferred to and stored on the authentication system or any external remote data storage, for example on enterprise directory 104 or any cloud storage.

In addition, this characteristic information may be used to calculate a fingerprint such as a hash of the combined collected characteristics in order to determine a string value that is dependent on all the characteristic information collected. For example, the authentication system 102 may send to the user computing device Javascript that collects device characteristics such as a browser language, HTTP headers, or fonts that are installed in the browser or on the computer, and receive these characteristics back from the user computing device through the Javascript mechanism sending the characteristics back to the authentication system typically through the use of the HTTP protocol, although other protocols may be used.

The authentication system will then use this information and store this information in the enterprise directory 104 or in its local storage or in the cloud. As referenced above, this characteristic information may be used to calculate a fingerprint for future comparison to other fingerprints. Similarly, for example, a one-time native mobile app such as an iPhone app, if deployed through the web to an iPhone device, may be utilized to collect and send the identification information from a device. This may be advantageous to use a program outside of a standard web browser to obtain additional fingerprinting information such as characteristics of an iPhone device that are inaccessible by the browser. This characteristic information may then be associated in enterprise directory 104, in the authentication system 102, or in the cloud, with user information such as a user ID. This creates a mapping of the user to his/her fingerprints, and a mapping of a fingerprint to a particular user that may be referenced by the authentication system 102. In some embodiments, the characteristic information of the device may be stored as collected in association with the user ID/user information and used to calculate fingerprint hash to assist in additional analysis.

The fingerprint and fingerprint characteristic information, and the user ID may then be used to validate the association of the user to a specific user device such as user computing device 110 during a subsequent authentication. In this way, the authentication system 102 may use the fingerprint as the additional factor in authentication (or in lieu of other additional factors described herein). Once the association is stored, the user's device may be considered a registered device. Once a user has registered one or more devices, the user interface on the authentication system may be used to manage the user devices and their fingerprints and characteristics that are associated with a specific user. For example, a user could delete one specific device and its characteristics/fingerprint to remove that device as registered in association with the user ID. Such a deletion may prevent the device from being used in association with that user unless the user once again registers the device and the characteristics are re-transmitted from the user device 110 to the authentication system 102. Thus, by removing a fingerprint associated with the user which is stored on the authentication system or other data storage, the association of the device to the user may be revoked, which may affect the additional authentication factors available to that user. Such deletion may be performed, either by an administrator or by the user, after successful authentication or login.

User Device Registration

Figure 2:
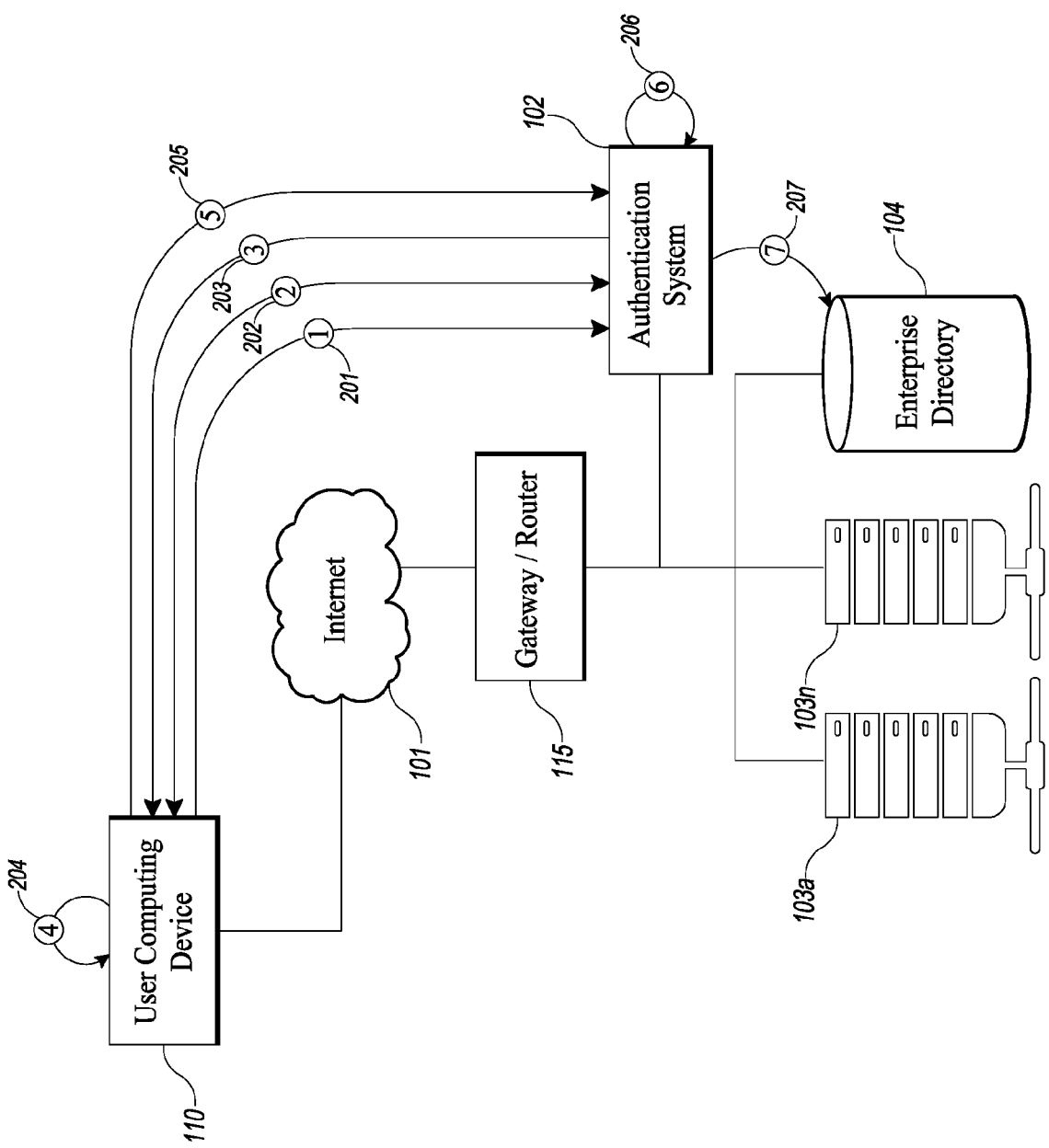
FIG. 2 is a block diagram of illustrative processes, communications and data flows between a user computing device and an authentication system for fingerprint registration, as described in some embodiments.

FIG. 2 illustrates the interactions between the user computing device and the authentication systems, resulting in device registration, that may be required in order to perform multi-factor authentication using user device fingerprint information, according to some embodiments. One prerequisite for this process, in some embodiments, would be for an administrator of the authentication system to enable a device registration on a per user basis for a particular domain or security grouping (e.g. for an entire enterprise, for a subset of users, etc.).

The registration process may be initiated by pointing the user computing device 110 to the authentication system to begin the device registration process. For example, this could be accomplished via the user being instructed to register their device via a browser based system. As another example, this could be accomplished via the user being instructed to register their device via a mobile application, for example, on an iPhone. Browser-based methods would not require any device control such as routing or administrative access on the user device but merely take the user to a self-enrollment process on the authentication system, for example through the authentication system's web interface. Registration may also not require any routing or administrative access on the mobile device by the mobile app.

Whether communication is performed through a browser, a mobile application, or a standard non-browser application, communication with the authentication system may be initiated through a redirect request, for example, web server 103a may, when the user computing device requests application or network resource access from the web server, that web server may require authentication. In some embodiments, the web server itself may perform authentication using a username and password by checking with enterprise directory 104 to authenticate the username and password. In addition, the web server app server may decide, if configured to do so, that an additional authentication factor is required in order to allow access to the requested web application or networked resource.

At this point, the web server may initiate or send to the user computing device a redirect request. This may be performed using a standard W3C mechanism, such as an HTTP meta-refresh or a header-based redirect mechanism. There are many redirect mechanisms that may be used in HTTP or other protocols as known by those skilled in the art. The redirect request may force the browser or other application program that is in communication with the web server 103a to contact the authentication system.

The device registration system may be implemented by the authentication system 102. For example, the authentication system 102 may run a server program that could pull either a device ID that is preprogrammed on the device or run a script to pull device distinguishing specifics from the device. Examples of a device ID include a hard drive serial number, a mother board serial number, a network interface card serial number, an IP address or other device ID.

In some embodiments, instead of a device ID, a fingerprint may be created using a hashing algorithm. To create the fingerprint hash the authentication system may send a script to be run by the user computing device to pull device distinguishing characteristics from the device, its browser, its operating system, and/or from the user. These device distinguishing specifics could include, for example, browser plugin names or versions, browser flash font list, browser font lists, a display resolution, HTML5 storage support (either local storage, session storage or remote storage, and data located within these storage areas), and other device characteristics. These device distinguishing specifics could then be stored in a manner that can be retrieved and compared on subsequent authentications. In addition, these device distinguishing characteristics can be used to create a hash value that can be considered a device fingerprint (i.e. a fingerprint hash for the device).

Among other characteristics, the script or executable may pull device distinguishing characteristics from the device browser, operating system, or user, may include characteristics such as HTTP header information, including, but not limited to, one or more of any of an HTTP user-agent(s) header, the HTTP accept header, the HTTP accept-charset header, the HTTP accept-encoding header, the HTTP accept-language header, etc. The characteristics may also include a browser plugin list this may include both the names of each plugin, the versions of each plugin, and/or how they are installed. The characteristics may also include a list of fonts that the browser has installed such as browser flash fonts. The characteristics may also include device IP address and/or network card address (such as MAC address). Other operating system settings such as device screen resolution on one or more display screens or any data stored in HTML5 local storage, or HTML5 session storage. It may also include Internet explorer user data support information, or values stored therein, or browser cookie data such as enabling or disabling the browser cookie setting, or any cookie stored by the browser. It may also include the user's time zone or OS language that is installed on the operating system, among other characteristics.

Whether it is a device ID that is pulled from the device or a fingerprint hash value that is created using collected device characteristics, the value such as the fingerprint, after creation, is stored in association with the user in an associated table. In addition, any characteristics that are collected may be stored with the user in an associated table. This table could be stored in a standard LDAP or active directory such as that deployed on enterprise directory 104 or in some relational database such as SQL, which may be deployed in the cloud or on the authentication system or as local data storage. In some embodiments the device can now be associated with the user by reference to this table.

An example of the first-time process that may be used to register a new user device 110 such as an iPhone, another type of mobile device, a desktop, a laptop or an iPad, will now be explained. With reference to FIG. 2, a user may attempt to access an application from a mobile device. The webserver accessed may redirect the browser to the authentication system for device registration and/or an additional factor of authentication. As a part of this redirect (communication (1) 201), the user computing device may send information as redirected from, for example, web server 103 to authentication system 102 requesting an additional factor of authentication.

The authentication system may then conduct a configurable secure authentication (2) 202. This may involve one factor, two factors, three factors, or four or more factor authentication. For example, a first factor of authentication of the user computing device may be from a user ID and/or password. This may be authenticated by the authentication system by looking up/verifying the user ID and/or password in enterprise directory 104.

Alternatively, or in addition, a user computing device may be authenticated using a one-time password. For example, a one-time password may be sent from the authentication system to a user cellphone as discovered through either looking up the username in the enterprise directory, or passed in the redirected request to the authentication system (1) 201. This one-time password may then be sent from the user computing device over the web to the authentication system to be verified (by, for example, typing in the one-time password in a web based form served by the authentication system). This verification may constitute an additional factor of authentication.

Other types of authentication may comprise a one-time password sent through an email. For example, an email address associated with the user may be looked up in enterprise directory 104 (or provided as a parameter via the redirect (1) 201). This email address may be used to send the user a one-time password. The one-time password may then be sent back to the authentication system either by typing the one-time password in a web-based form or clicking a link in the email that will send the one-time password back to the authentication system.

Another example would be a telephone call or help desk call initiated by the authentication system. The user may receive over the telephone the audio sound (spoken or spelled by a computer or help desk person) of a word representing a one-time password. This one-time password may then be typed into a form presented by the authentication system and used to authenticate and compare against the one-time password that was sent over the telephone. Thus, in 202 this authentication or initial authentication of the user computing device may take place.

Once the user computing device is authenticated in some manner (or if the user ID is provided by the redirect), the authentication system may now have knowledge of a user ID associated with the user using the user computing device 110. Upon successful authentication the authentication system may then send server based commands to the user computing device 110 to pull the unique characteristics from the user computing device (3) 203.

As described above, this may include header information, fonts, plugin information, screen size, HTML5 storage facilities, IP address, cookie storage and/or other unique characteristics (including browser settings) accessible by the program sent to the user computing device. In communication (4) 204, user computing device executes command received. These instructions may be Javascript instructions, or any other type of programmatic command, such as flash instructions, or an installed executable binary. For example, this script/executable could comprise an installed mobile app that is installed on the user computing device if it is an IOS device or Android device (or other mobile device). The program or script may query the browser, OS, hardware, etc., or perform searches on the user's device such as searching its storage devices for particular information, to gather the characteristics. These characteristics are then sent back in communication (5) 205 to the authentication system, for example, as HTTP GET or POST parameters.

The authentication system may use the collected characteristics to create a string variable such as a value that is the result of a hash program being executed on the characteristics. For example, the authentication system can concatenate together all, or a subset of, the collected unique characteristics of the user computing device 110. These characteristics that are concatenated may then be inputted into a hash program such as an SHA1 or MD5 hash program to produce a string that represents a fingerprint. Any technique known in the art to produce a fingerprint or hash over a sequence or concatenation of data may be used to generate the fingerprint.

In action (6) 206, after creating this numeric representation (or alphanumeric representation or any character set representation of the unique values using for example the hash), authentication system 102 then stores the fingerprint to the local enterprise directory 104 or to local storage. This may include storing, in association with the user ID, in a table, such as SQL table(s) or to the enterprise directory, the fingerprint hash value. The storage action may also include together, or separately, an association of each individual characteristic value collected with the user ID and/or fingerprint hash.

Once the fingerprint has been created and the user has been authenticated, the user may then be redirected to the original target resource, for example, web server 103a. This would be the resource that originally redirected the user computing device to the authentication system 102 for an additional factor of authentication. This redirection may include an indication of authentication, such as an authentication token. This indication of authentication could be, for example, a cookie, or other data structure, stored by the user computing device's browser that indicates that that user was authenticated using an additional factor. The data structure may be in plain text, or encrypted (with either public/private key encryption or symmetric encryption) to enhance security, or could comprise a verifiable digital signature by the authentication system.

The authentication token data structure may also comprise an indicator of the additional factor(s) that the token is based on. For example, if it was a one-time password communicated through telephony used to authentication the user, then that factor may be indicated in the data structure. In the alternative it may also indicate that a fingerprint was created and/or used during the authentication, and that is the separate factor.

The authentication token may also be used for access to additional network services in lieu of authenticating an additional time with the authentication system. This allows the network service, such as web server 103a or app server 103n, to trust the authentication token received from a prior authentication transaction with the authentication system. For example, when the user computing device accesses the web server or the application server initially, the authentication token from a previous session may be verified, and the user granted immediate access by the web/network service without having to perform another authentication exchange with the authentication system. For information regarding the single sign on feature and authentication token, including performing additional factors of authentication via a digital certificate, U.S. Pat. Nos. 8,327,142, 8,301,877, 8,613,067, 8,510,816, and U.S. patent applications Ser. Nos. 13/830,506, 12/948,037, 12/419,951.

Figure 3:
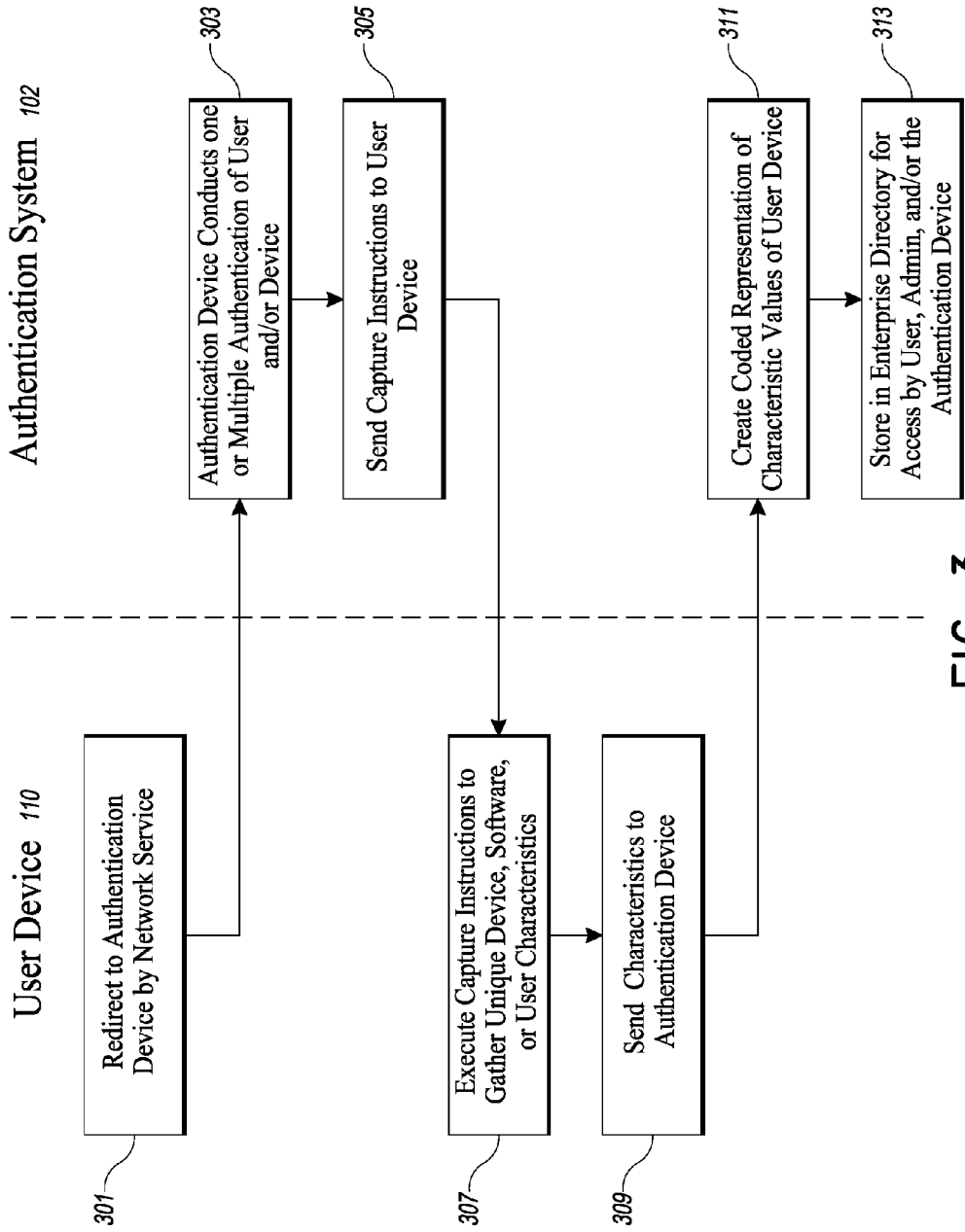
FIG. 3 is a flow diagram of illustrative processes, communications and data flows between a user computing device and an authentication system to register a fingerprint for the user computing device, as described in some embodiments.

FIG. 3 illustrates a method of providing and registering an additional authentication factor as a fingerprint. FIG. 3 is divided into two relative areas: the user device 110's actions, and the authentication system 102's actions on the right. While FIG. 3 illustrates the method according to at least one embodiment, some embodiments will implement the method different with different actions being on the authentication system and other actions being on the user device. In addition, the method may be implemented not necessarily in the order depicted in FIG. 3.

In the embodiment depicted in FIG. 3, the user device 110 is first redirected to the authentication system by the network service (e.g. web server 103a). The authenticated user device may then send information as disclosed herein to the authentication system 102 in order to conduct a one or multifactor authentication of the user and device. In block 303 the authentication system conducts the one or multifactor authentication of the user device. For example, it may conduct a username and password authentication, a one-time password authentication, and/or a certificate-based authentication. Once a user and/or the user device 110 is authenticated, the authentication system 102 will collect additional characteristics about the user device 110 in order to calculate a fingerprint, such as a hash. This may be performed by, first in block 305, sending capture instructions to the user device as disclosed herein which may be Javascript and/or another collection instruction(s). User device in block 307 executes the capture instructions to gather unique device, software, operating system, and/or user characteristics.

These characteristics may be, although not completely unique, certainly indicative when taken together of a unique device. For example, the probability that a single device will have all unique characteristics to be identical and thus creating an identical hash are very low.

These characteristics are then sent in block 309 to the authentication system. The authentication system may then create a coded representation of the characteristic values of the user device 311. As explained herein this may be a fingerprint such as the result of a hash. This hash exploits the combined uniqueness of all the characteristics of the user device as collected by the capture instructions. For example, because of the characteristics of hashes and their one-way nature, a collection of characteristics, even if one characteristic is different between one device and another, with all other characteristics being equal, will produce a completely separate unique hash value that is dependent on the unique combination of characteristics of the device. In this manner, the hash-based fingerprint may be used to distinguish between user devices.

The registration is complete once the characteristics and/or the fingerprint are stored (block 313), for example, in an enterprise directory 104, SQL tables, or other data storage. The stored characteristics may be accessed by the authentication system for future authentication or configuration of the user or user device. Furthermore, the fingerprint and/or device characteristics may be stored in association with the user's ID or other information representing or signaling a user. Once this is complete, the user device 110 is considered registered within the authentication system 102.

User Device Validation

After registration, the user device 110's fingerprint may be used as an additional authentication factor for verification of user credentials. For example, one authentication factor may be that the user device has been seen previously in association with a specific user ID. For example, on subsequent authentications, the authentication system may be able to map the user ID of a user to the fingerprint of one of his stored devices, and compare that with the current device that is accessing the authentication system 102.

Such a mapping may be the result of collecting the user ID information from a form, or via a header from the redirect, or based on a received session cookie. For example, the user ID could be stored in an authentication token stored by the browser or be associated with an authentication token. For example, an authentication token's unique number may be stored in the authentication system as associated with the current user ID, which allows lookup of the current user ID. The authentication system may also be able to map the stored device ID. For example, if a device ID such as a hardware ID or a hard drive ID was collected, the authentication system store it in enterprise directory 104 and retrieve it in order to map the device to the user. In addition, the system is able to map the new device fingerprint to the user ID such as by using a table as described herein during the registration process.

Each time the network service requires the additional factor of authentication and redirects the user computing device to the authentication system, the authentication system may request the user computing device 110 to run the script/instructions and provide the characteristics unique to the authentication system 102. The authentication system 102 may then, each time the additional factor authentication is required, compute the device's fingerprint and compare it to the known fingerprint for the computing devices associated with the user authenticating. This comparison may be implemented via the tables and associations described above.

If the fingerprint matches a device known to the user and registered to the user, then the user may never actually see any webpages associated with the authentication system. Instead, the authentication system will accept the provided characteristics as the additional factor of authentication and merely redirect the user computing device back to the network service. This redirection may be accomplished using, for example, a browser redirection instruction as noted in the W3C standards, which may be done in HTTP headers or other methods known in the art. In this manner, the user of the user computing device may never see any webpages associated with the authentication system and the additional authentication provided by the authentication system will seem seamless to the user.

In some embodiments, upon redirection the user device 110 may already have an authentication token. The authentication token, for example, may be a session based ticket installed in the browser that can be received by the authentication system and used to pull the user ID from the session based ticket. This user ID or any ID that is used across session-based tickets may be mapped to the device table either in enterprise directory 104 or located within the authentication system or in the cloud to determine whether the device is associated with the user.

If this device is on the list of trusted devices of the user, in other words, it has a registered fingerprint or its characteristics match or closely match the characteristics of devices registered to the user (see the Auto-Updating Fingerprint section), then the user is allowed to access the new network resource through the redirect.

This trust and seamless access may be accomplished across multiple network services or network applications (e.g., single sign-on may be supported). For example, the user computing device 110 may complete registration of the device fingerprint after redirection from one network service its user device. At this point in some embodiments, it may have an authentication token indicating that a user computing device has completed the additional factor of authentication. When the user computing device and its browser browses to a second network service and contacts the second network service, then the user computing device may be redirected back to the authentication system for additional authentication like was done with the first network service.

However, because the user computing device is already registered, the user computing device will be immediately redirected to the second network resource because of the match found of the fingerprint to the user's associated devices. In this manner, a single sign-on may be allowed for the user computing device. In other words, once the user computing device is registered, the user computing device need not login to the authentication system to provide the additional factor, and instead may simply provide its unique characteristics to the authentication system(s) to enable single sign-on technology.

Figure 4:
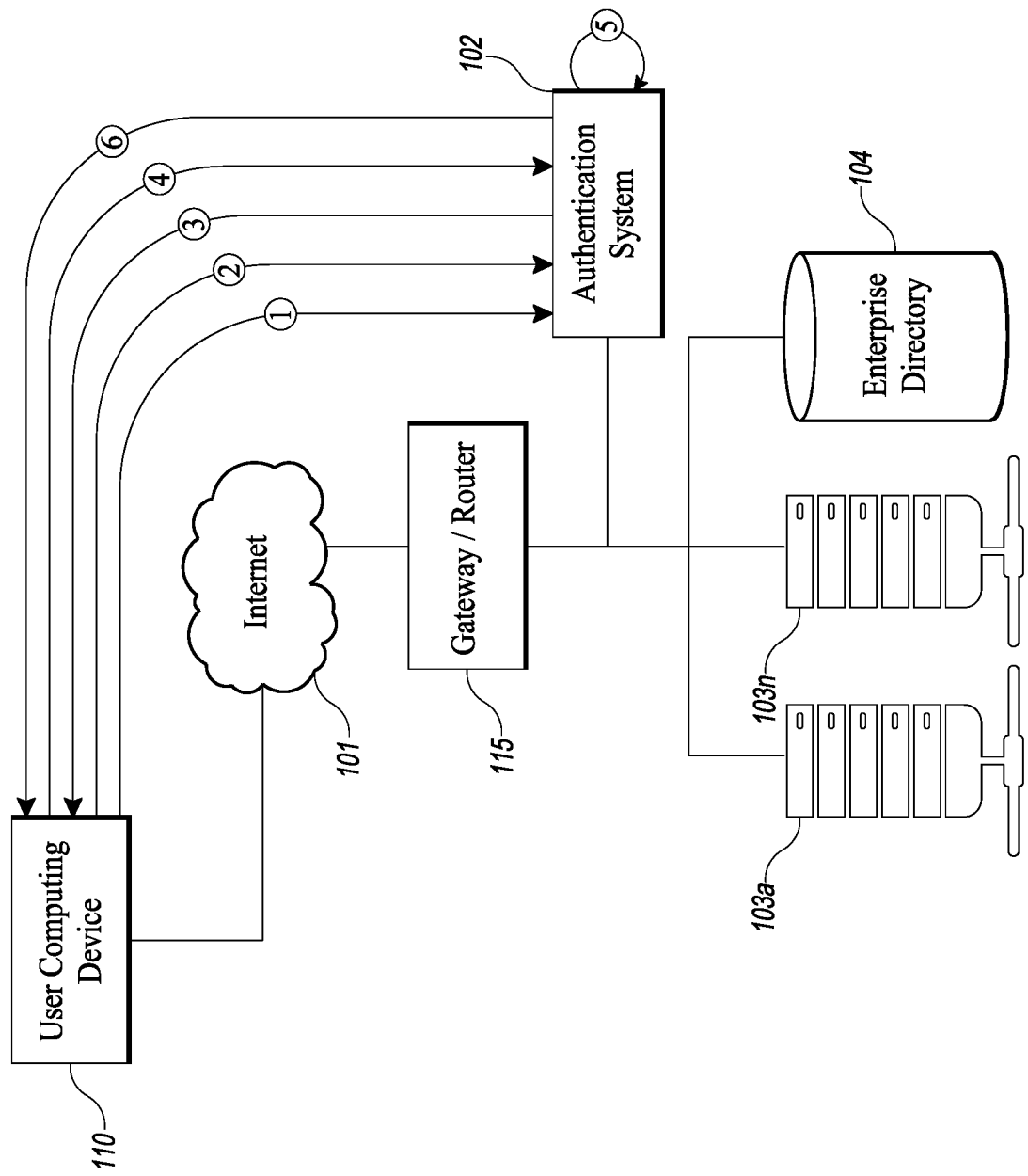
FIG. 4 is a block diagram of illustrative processes, communications and data flows between a user computing device and an authentication system for validation of a fingerprint, as described in some embodiments.

For example, FIG. 4 illustrates the interactions between the user computing device and the authentication system during validation. Once the device is registered to the device subsequent authentications appear seamless and low-friction for the user. In FIG. 4 the user computing device in communication (1) may be redirected to the authentication system for an additional factor of authentication. For example, the user may attempt to access the network service or the web service on web server 103a from a desktop or a mobile device represented by user computing device 110, and is redirected to authentication system 102 for authentication or for an additional factor of authentication.

The user may then supply its enterprise credentials, for example the user may supply a user ID and/or password or certificate or any other factor of authentication such as a one-time password to the authentication system. These types of credentials of the user or the user computing device may be authenticated via the enterprise directory. For example, the username and password may be sent to the enterprise directory for verification. The credentials such as username and password, or a certificate based signature, may be sent to the enterprise directory for validation or the enterprise directory may be queried for information that may be used to authenticate the username and password or certificate or other password or other additional authentication information.

In communication (3) the authentication system sends instructions to the user computing device to gather and collect unique device characteristics about the browser or the operating system or the computing device or the user or any software residing on the system. A list of such characteristics is disclosed herein. In communication (4), these characteristics are sent back to the authentication system. In action (5), the characteristics are used to calculate a hash. For example the characters may be concatenated together in order to act as a content string for the hash to calculate over. The result may be considered a fingerprint of the user computing device.

This fingerprint is then compared with other fingerprints of other devices that are associated with the user ID in the data store that previously authenticated. These can be queried from the enterprise directory or based on a table in the authentication system. If a match is found, the authentication system counts it as a successful second factor authentication, and therefore no additional authentication factor is required such as SMS telephony, or knowledge based authentication. The authentication system may then return an authentication token that provides single sign-on to the user device for access to the network service which may be a cloud, web, or mobile resource. This authentication token may be accepted by other network services in lieu of requiring an additional factor of authentication.

Cloud Based Two Factor Persistent Authentication Service

In some embodiments, no user ID or password, or other user information need be stored in the cloud or in association with the authentication system 102, at least initially. Instead, the authentication system, which in some embodiments may be deployed as a cloud service, may be able to receive user ID/identification and profile information dynamically when additional factor authentication is required. The authentication system 102 will have a variety of supported one-time password mechanisms, but instead of storing username and password information it will instead be able to create, store, and validate device fingerprints to provide on the fly a second factor of authentication for authentication that has already occurred, such as username and password authentication by the network service, web service, or application service itself.

Similarly, in some embodiments the registration process and validation process may occur at the same time. Such a service may be designed to facilitate and easily integrate a solution for a second factor of authentication for enterprise applications, enterprise network resources, cloud-based resources, and native mobile applications. This solution is designed to integrate into existing environments.

For example, the web service can use its current authentication mechanism such as a local LDAP server or active directory, to authenticate a user based on the enterprise's user information stored in those directories (e.g. using a password or a certificate). In addition to this local authentication, the web service could also redirect the user to the authentication system. This may be done through browser redirects governed by conventional and readily accepted browser standards such as the W3C standards.

Figure 5:
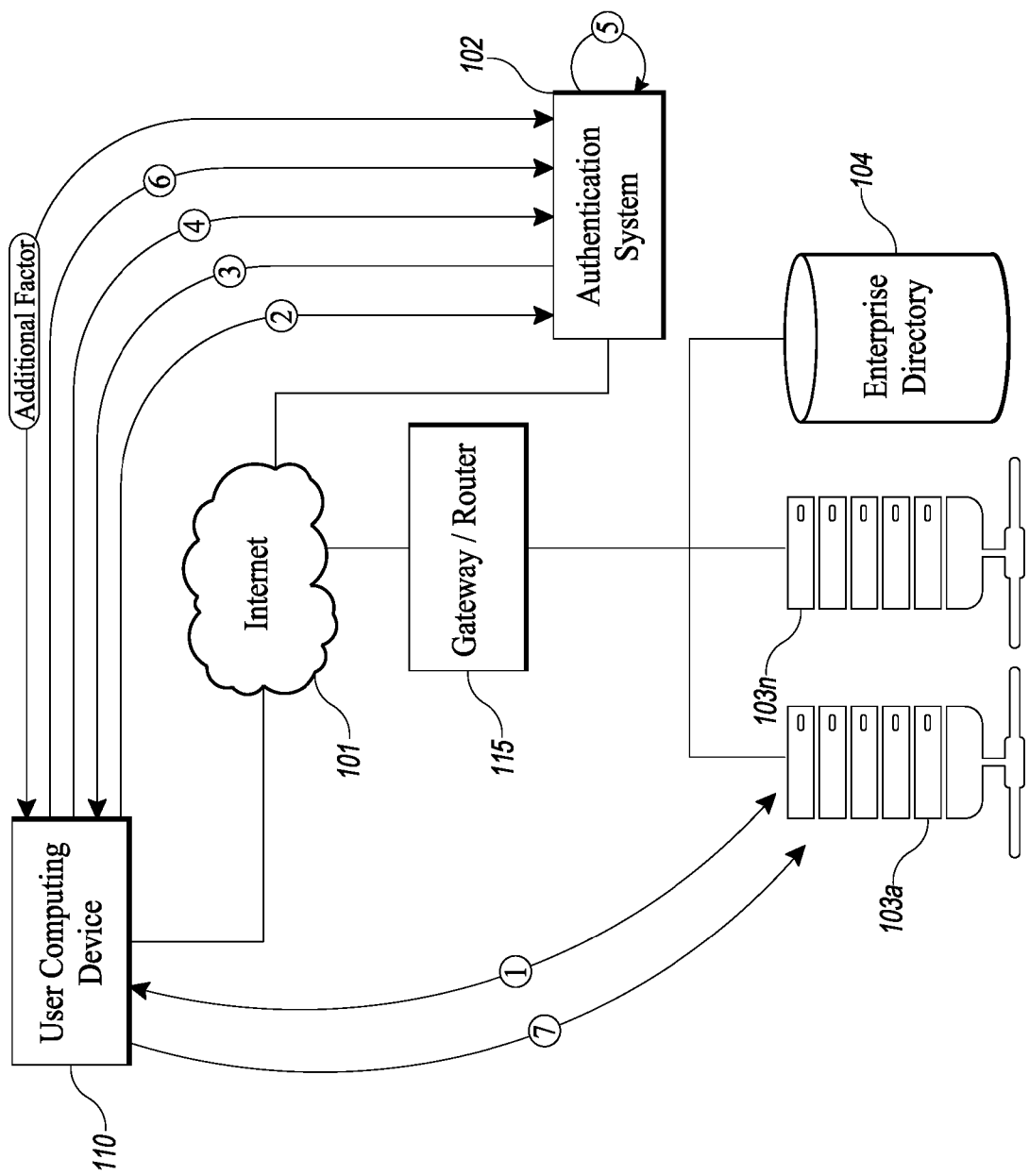
FIG. 5 is a block diagram of illustrative processes, communications and data flows between a user computing device and an authentication system, implementing a cloud service, for validation or registration of a fingerprint, as described in some embodiments.

FIG. 5 illustrates one embodiment of a cloud-based system for persistent authentication of an additional factor, in this case device fingerprint. This embodiment's configuration has the authentication system 102 directly connected to the Internet, and not deployed within the enterprise's network.

In communication (1), the user attempts to access the target application. For example, the target may be a web application, a network resource, or a software-as-a-service (SaaS) cloud application, or a native mobile application. The application may then conduct a standard authentication of user ID and password using its preexisting client server dialogue. For example, it may utilize existing data connectors to its on premise data stores such as enterprise directory 104 that may run active directory LDAT, SQL, or other data storage and user information repositories. If the target is configured to require an additional factor of authentication such as a second factor, the web server may redirect the user's user device 110 to the authentication system 102 (2), which in this scenario may be located in a cloud service.

The cloud service/authentication system 102 and the web pages on the authentication system may be configured to have the same look and feel of the target application. For example, the authentication system 102 may serve web pages with the same look and feel as the enterprise running the target application, and may have an authentication workflow that may be configured by the enterprise running the target application. This may be done through a configuration user interface that is accessible by the enterprise through the cloud to configure the look and feel of the authentication interface for its enterprise users (e.g., based on IP address, or IDs in the redirect information, etc.).

The entity that requested authentication, for example the target application, may send, via the redirect to the authentication system 102, information requesting authentication using an additional device-based fingerprinting factor. For example, it may send a cookie or other token to the user computing device that may then be sent from the user computing device to the authentication system, and may comprise a number of different elements and information. Alternatively, the information may be passed in a URL parameter in the redirect URL itself. For example, the redirect could use a number of HTTP GET/POST parameters to transmit such information.

No matter the method of transmission, the information sent from the network resource to the authentication system 102 may comprise, for example, a user identifier such as a user ID, an email address associated with the user of the user device, a telephone number associated with the user or the user device, an SMS number associated with the user of the user device or the user device a push number or a pin. In the alternative, it may include any other dynamically retrieved information from the enterprise data source that may be used by the authentication cloud service to identify or contact a user.

Similar to FIGS. 3 and 4, the cloud service, in this case the authentication system 102 in FIG. 5, may be able to send instructions to the user computing device in communication (3) to gather and collect unique or nearly unique device information. This information may then be sent back in communication (4) to the authentication system. The types of information collected is similar to that described above under registration, and may include browser information, screen resolution, fonts installed, etc.

In action 5, using the information collected, the authentication systemmay calculate a hash across all, or a subset, of the collected characteristics from the user computing device 110. The cloud service may then access its local data store to determine whether the hash received has already been associated with the user ID received directly or indirectly from the enterprise resource that was attempting to be accessed.

If a match is made, then a successful authentication token may be sent back to the authentication calling product. In this example, it is web server 103a which is an enterprise network resource that is using the authentication system 102 to perform an additional factor of authentication. This authentication token may be sent back to the user computing device for storage in its browser. The user computing device may then, in communication 7, send this information to the web server to prove that it has performed the additional factor of authentication.

If a match is not made based on the hash fingerprint, then a comparison may be made of the characteristics collected by the user computing device to previous characteristics collected by the user computing device or any computing device that is associated with the user ID sent to the authentication system 102 from the original redirect. This step may be optional and instead the system may merely perform the fingerprint-to-fingerprint hash match instead. If there is a match of characteristics compared on a one-to-one basis for each characteristic, or if it meets a configurable threshold of matches of the characteristics (such as a percentage match) then authentication may be considered successful as well. In this case the authentication token may be returned back to the calling party as described above.

Additionally, as described herein, the fingerprint of the user computing device 110 that is currently associated with the user ID may be updated to reflect the new device fingerprint because there was not a complete 100% match but the match of the characteristics did meet the threshold for updating. This allows the user computing device to update its fingerprint when only a few parameters of the user computing device change such as a time zone value which may affect the hash, but in total very few changes have been made. This will reduce the burden of the user going through additional authentication tasks. For more information about using characteristics for comparison, and updating fingerprints, see the section on "Auto-Updating of Device Fingerprint and Characteristic Matching."

If the user device was not matched either based on its fingerprints or based on a comparison of a stored user device's characteristics versus the user device's characteristics retrieved from the user device for this session, then the user may be forced to authenticate using an additional factor of authentication. In this case, a one-time password mechanism may be used. For example, an SMS message that may be sent to the user's phone; a telephone call may be made to the user's phone, whereby an audio voice describes a one-time password to be used; an email message may be sent, whereby the email message may include a link to verify that the email message was received (this email link may trigger the user computing device's browser to go to a specific web page that is provided by the authentication system); a push notification may be sent to a push number for the user; and so on.

In any case, the authentication system 102 directly or indirectly communicates with the user and conducts the delivery of the one-time password in an out-of-band channel. For example, the one-time password, before being sent to the user, regardless of the method that it is being sent to the user, may be stored by the authentication system. It may be a randomly generated string. Once communicated to the user, this randomly generated string may then be returned by the user computing device to the authentication system through the web and may be compared to the stored one-time password that was originally sent. If they are the same then the additional factor of authentication is successful.

Other factors of additional authentication besides a one-time password may be a USB key that has a verifiable unique device ID that must be plugged into the user's device 110, or an NFC card that may be in communication with the user computing device 110. In addition, it may be a certificate for which the user computing device has access to the public key, or may be associated with a user ID of a user that is operating the user computing device.

If the one-time password authentication is unsuccessful or other authentication mechanisms are unsuccessful, a web token may be returned to the user computing device which may then be redirected back to the web server indicating an unsuccessful authentication.

This additional factor authentication is represented in FIG. 5 via the two-way "additional factor" communication indicated as being communicated between the user computing device 110 and authentication system 102.

If the one-time password authentication or other additional factor authentication is successful, the device fingerprint and/or its unique characteristics that were collected may then be stored locally in the cloud service within the authentication system 102 and be associated in a table with a user ID. Multiple devices may be associated with a single user. This allows an additional factor of authentication to occur, in other words, using a fingerprint of the device, which was previously authenticated by the user via a one-time password, to skip additional one-time password authentication steps in the future. The additional fingerprint factor going forward is the look up the user ID in the table, comparing the hash values that are stored in association with the user ID to a currently collected hash value, and determining if there is a match of one or more hashes. If that is the case, then any one-time password authentication may be skipped.

If the one-time password or other additional factor authentication is successful, then in communication 6, the successful result may be communicated back to the user computing device 110. The communicated indication may denote that a successful additional factor of authentication has occurred, and/or name the specific successful additional factor. The user computing device then returns this authentication token in communication (7) to the network service that was being originally accessed in communication (1). That service then examines the token and verifies its, using, for example a cryptographic method if necessary. The network service (e.g. web server 103a) may then allow the user computing device access to its resources.

In some embodiments, the enterprise deploying the network service that requires the additional factor authentication may pick and choose what type of authentication is required. For example, the one-time passwords that may be used in order to register a device fingerprint hash may be selected based on any requirements that a particular enterprise has. The enterprise may use a user interface deployed on the authentication system, such as authentication system 102 in the cloud, to indicate to the authentication system that a specific one-time password type of distribution such as email, voice, push notification, or SMS has been chosen for us.

In addition, using the same user interface they may specify the look and feel of the authentication that is taking place. For example, each webpage that asks for the one-time password may use style sheets or other template frameworks used by the enterprise and their own web services to be displayed in the pages that the authentication system presents to the user.

These pages and/or styles may be uploaded through the user interface tool or dynamically downloaded from the authentication system from the enterprise for each web page that is being run on the authentication system. For example, the authentication system may be configured to download the template from the web server using a normal HTTP or HTTPS request from the user computing device 110, or may configure its web pages to instruct the user computing device 110 to download and display these style elements directly through the web server 103a.

In addition, the enterprise may be able to configure the authentication system such that multiple one-time passwords may be required to register the fingerprint hash. For example, an enterprise may require that both an SMS one-time password and an email link one-time password must be used before registration is effective of the user device hash. In addition, other additional factors besides one-time passwords, such as a certificate that is associated with the user computing device and/or the user. For more details on how to use the certificate for an additional factor of authentication, see the applications incorporated by reference herein.

In addition, the authentication system may determine whether persistency of the authentication token is allowed. For example, the authentication may be used as a single sign-on token that may be presented to other network services that accept the token. In this embodiment, the additional network service may accept the token in lieu of performing any other additional factors of authentication. In a different configuration, the authentication token may not be used by other network services, and additional one-time passwords and/or verification of the fingerprint hash or matching of the fingerprint characteristics must be performed by the authentication system before other network services can be accessed by the user computing device 110. In addition to the cloud deployment embodiment, this additional factor type of authentication may be deployed directly in the enterprise. For example, authentication system 102, instead of being connected to the Internet in order to communicate with the enterprise, may be deployed directly in the enterprise's network and may be configured by the enterprise administrators separate from any third party cloud administrators.

Figure 6:
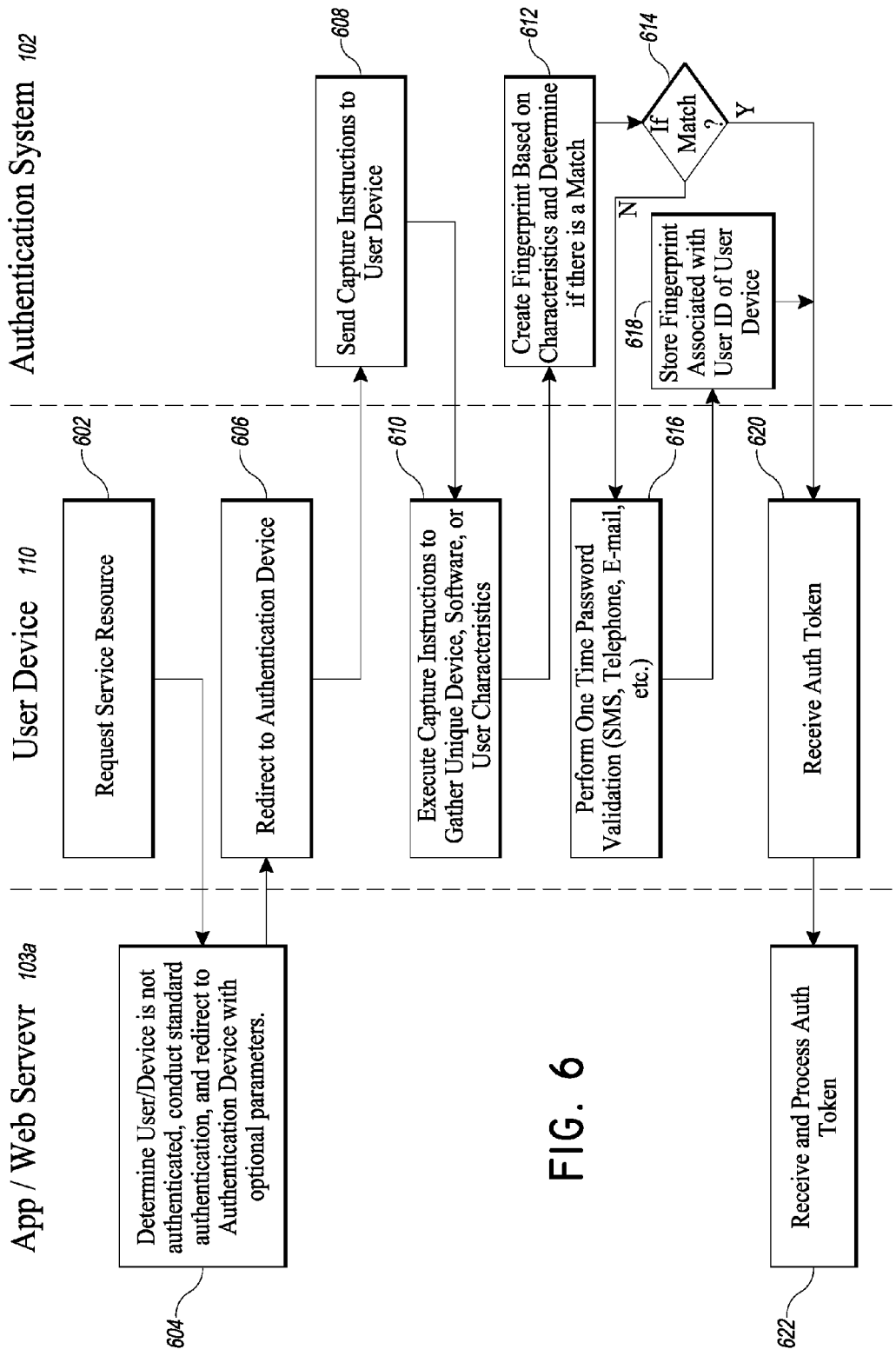
FIG. 6 is a flow diagram of illustrative processes, communications and data flows between a user computing device, an enterprise app/web server and an authentication system to register and/or validate a fingerprint for the user computing device, as described in some embodiments.

FIG. 6 illustrates an embodiment similar to FIG. 5, in flow chart form. User device 110 requests a service from a resource associated with an enterprise. In 602 this request is sent to the app or web server, for example 103a to be handled. App or web server 103a then determines 604 whether the user and/or the device is authenticated and, if not authenticated, may redirect to the authentication system with optional parameters. For example, the app or web server may authenticate the user device using a username and password. However, it may also require an additional factor of authentication.

To satisfy this additional factor of authentication, the app or web server may, via an HTTP redirect, redirect the user device to the authentication system to handle the additional factor of authentication 606. As part of this redirect it may insert optional parameters to be sent to the user device to be forwarded to the authentication system using the redirect mechanism. For example, these optional parameters may be a user ID or any indicator of a user associated with the resource attempting to be accessed, such as an email address, a telephone number, an SMS number, a cell phone number, a push information number or mobile app push token value, a password or pin, or any other dynamically retrieved information from the enterprise data storage that can be used by the authentication system to perform authentication of an additional factor.

The authentication system then would send capture instructions to the user device to be executed 608. In block 610, the user device may execute the capture instructions to gather unique device software, user, or operating system characteristics such as a browser's fonts, other browser settings or plugin settings, or other information about the device that taken together may be considered unique to the device. These characteristics are then sent to the authentication system.

In block 612, the authentication system may create a fingerprint based on the characteristics and determine if there is a match. In block 614, if there is a match with another fingerprint stored in a table in association with the user ID that is to be authenticated, then the authentication system 102 may generate and create an authentication token, store a record of the authentication token and/or that the token was created, and link it to the user ID. Then, that token may be sent 620 to the user device for storage by its browser in data storage on the user device 110.

This authentication token may then be sent to the web server 103*a* to be processed 622 by the web server 103*a*. If the authentication token is authentic, which may be protected by cryptography as described herein, it may be accepted by the app web server 103*a* and then the user device would be allowed access to the network service provided by the web server 103*a*.

On the other hand, in block 614, if there is not a match, then a one-time password authentication or any other additional factor of authentication may be required before sending off the authentication token to the user device. In this scenario, in block 616, the authentication system 102 and the user device 110 perform a one-time password validation as described herein. Any form of additional authentication may be used. This exchange usually comprises the authentication system sending the one-time password over one of the SMS, telephony, push notification, or email channels for example, and the user device sending that information back through its web browser to the authentication system 102 to verify that the user device received the one-time password.

Once this is done, the fingerprint that was created for matching is stored in association with the user ID of the user device in the authentication system in the cloud. In other embodiments, this may be stored elsewhere, for example, in the enterprise data store 104. This association allows additional later verification of fingerprints without having to perform the one-time password additional authentication factor. At this point, an authentication token may be generated by the authentication system 102. User device 110 may receive the authentication token which may be sent to application web server 103*a* for processing 622 as described above.

Device Inventory

After registration of the user device 110, in some embodiments, authentication system 102 presents the option for administrators of authentication system 102, enterprise administrators, and/or the users themselves to see which devices have been registered in association with the user.

The devices may be named in the authentication system's database or in enterprise directory 104, including, for example, names like for example Windows 7, Android 4.3 Jellybean, OS10.8, Jimmy's Office Machine, Elena's Apple Tablet, or any other name that may have significance to describe the device, indicate ownership of the device, or any other name ascribed to the device by the user or the administrator. Users and administrators may login to the authentication system 102 to view the inventory of their current user devices that have associated fingerprint characteristics and fingerprints with their user devices.

From this inventory, the user or admin can see what devices have been registered and when the last update of the fingerprint has been made. For example, each device along with the name may be displayed in a webpage user interface with a date. That date may signify either one of: the date that the fingerprint and/or fingerprint device characteristics of that device were collected and associated with the user, or it reflect the date that the fingerprint and/or fingerprint characteristics for that device were updated in the authentication system 102 database. This information would be stored in a database associated with the user ID or any identifier associated with the user. The database could be the same data store, for example, an active directory, SQL database, etc., or it could be a separate data store with associated key values aiding in the mapping and referencing of the user ID.

For example, an SQL database implemented within the authentication system may store in a table a user ID, and an associate with that user ID, in a table row, a key to or the name of the user device along with any hash and characteristic data that may be stored in that table, or in other tables linked to that table. Alternatively, in active directory, the user ID's person entry or person object may store in association with that user, the fingerprint hash value of the user device, along with its name and most recent date of updating or creation, in addition to, in some embodiments, user device characteristics for that device. This allows the authentication system to easily query either an SQL database or LDAP to determine what user devices are associated with the user ID, and use those listed devices and associated devices to manage the device inventory and/or validate user devices requiring authentication by using this additional factor—the fingerprint hash.

Device Revocation

As a part of the management of the fingerprints and user devices described above, devices associated with the user may be revoked. Revocation is a broad term, and encompasses its plain and ordinary meaning, and may comprise removing the association between a user ID and a fingerprint, and/or removing the association between the user ID and the stored device characteristics that the fingerprint is dependent upon, in order to remove that user device as a device that proves an additional factor of authentication.

For example, the user interface described above, to manage user computing devices that are associated with users, may have the ability to review and revoke the devices associated with the specific user. This revocation may be performed on an individual basis, for example, by selecting one or more devices to revoke. Or, this revocation could be done for all devices of a user at the same time. The selection of which devices to revoke may be indicated to the authentication system using a variety of parameters that may be based on web based form input such as a check box to indicate whether a device should be revoked. For example the check box can be configured so that if the check box is checked, the device should be revoked, or if the check box is unchecked the device should be revoked, depending upon the embodiment. Likewise, a button or other indicator within a web form could indicate that all devices for users should be revoked.

This configuration user interface may be displayed along with the device name, a date for either registration or the last update of that device, in addition to zero or more characteristics of that device that may be displayed alongside the device name. This system would give both users and administrators a web-based console to view which devices are associated with the user, and to revoke any devices that the administrator or user no longer want to allow as being sufficient to provide an additional factor of authentication.

In some embodiments, the name of the device may be automatically generated. For example, it may use a characteristic, such as the operating system, to automatically name the device for the user or administrator. This name may be altered later in the user interface by the user or administrator. For example, the device name may be the operating system of the device such as Windows 7, alone or in conjunction with other characteristics, such as the browser and its version, the version of the operating system, or any of the characteristics that are collected by the authentication system's capture script.

When a user or administrator logs into the authentication system to configure or revoke their associated fingerprints, the authentication system 102 may query its local data storage or the enterprise directory for the listed devices to display. The authentication system 102 may also send a web user interface to the user computing device 110 for display to the user or administrator. Once the user has interacted with these pages, the authentication system 102 may be sent a subset of information, based on the forms presented, to act upon, including updating names or revoking one or more registered devices.

The revocation is in some embodiments a graphically user interface controlled action of unclicking the check box next to the name of the registered device and then selecting a button such as a "revoke selected devices" button. The devices can be revoked individually or all associated to a user.

Figure 7:
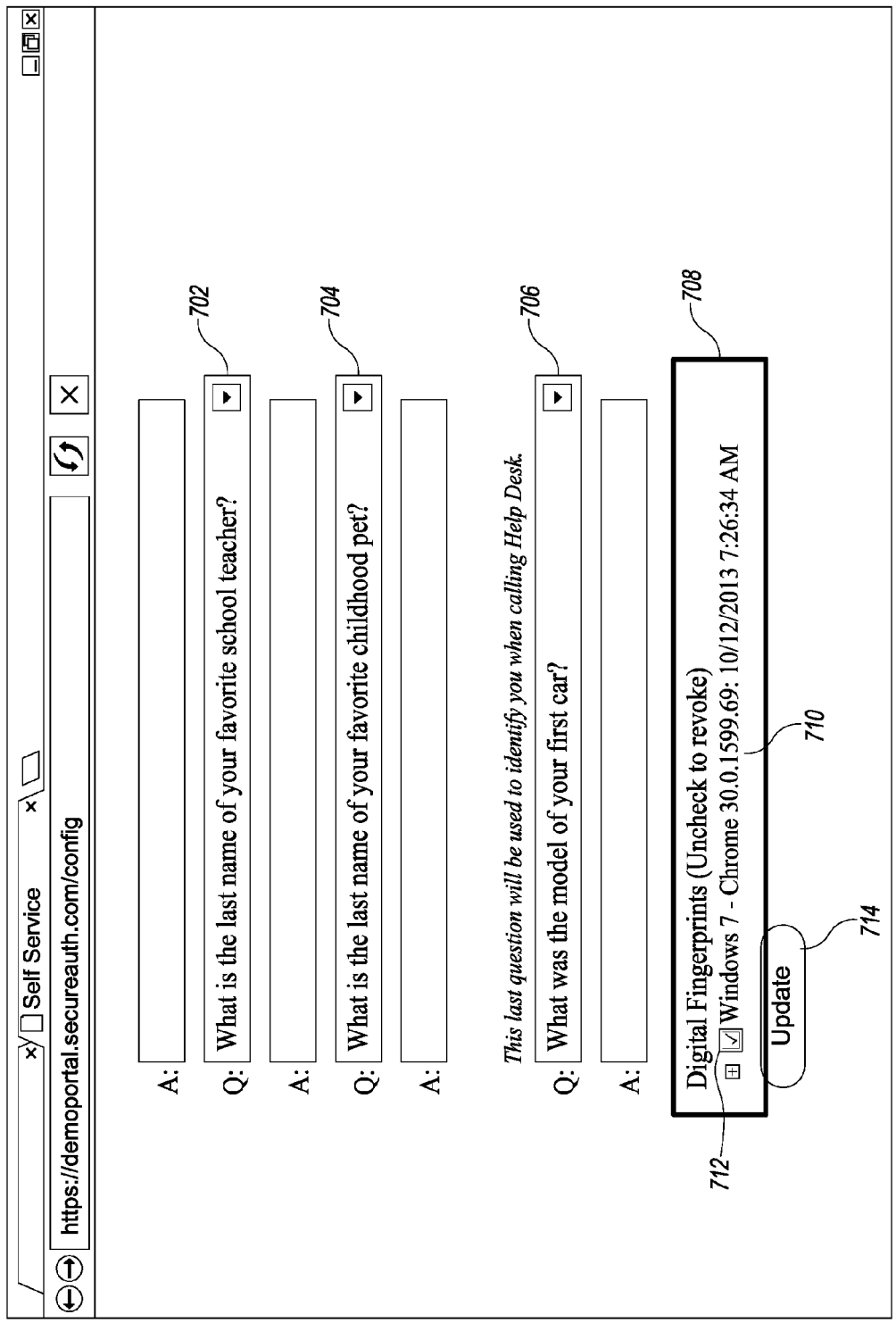
FIG. 7 is an illustrative, web-based user interface of a fingerprint management and/or revocation interface, as described in some embodiments.

For example, FIG. 7 illustrates an example web page user interface that a user or an administrator could use to revoke the fingerprints associated with their user account, or any user account if it is an administrator. The web page user interface may list all digital fingerprints associated with the user ID. For example, 712 shows a user computing device fingerprint called Windows 7-Chrome 30.0.1599.69 that was updated or registered at 7:26 a.m. on Oct. 12, 2013. If the user unchecks the check box associated with fingerprint 712 and updates their associated fingerprints by clicking the update button 714 then the browser on the user computing device would send an HTTP or HTTPS message to the authentication system to indicate that that fingerprint should no longer be associated with that user ID or should be deleted.

This may mean that any device that has that fingerprint will no longer be associated with that user ID, as the authentication system may act on the message and disassociate that fingerprint with the user ID and/or delete the fingerprint. In the future when that user computing device attempts to use the authentication system to prove that an additional authentication factor has been satisfied, that user computing device must perform the registration process again and will not automatically be issued a successful authentication token.

This interface may also be used by the user to set up additional user based information that can be used for additional authentication mechanisms, including, for example, knowledge-based question and answer mechanisms. In form 702, for example, appears a configurable question, for example, "what is the last name of your favorite school teacher" or 704 "what is the name of your favorite childhood pet" or 706 "what was the model of your first car." These are examples of knowledge-based questions with associated, configurable, answers, which can be supplied to the authentication portal for the user as an additional authentication factor. Thus, like the email, SMS text, push notification, and telephony one-time passwords, the answers to these questions when that question is prompted by the authentication system may be treated as an additional authentication factor, which, like the other one-time password methods, may be used to register a fingerprint of a device as an additional authentication factor.

FIGS. 8A and 8B illustrate one possible user interface for an administrator to delete and/or revoke device fingerprints associated with a user. For example, 802 shows a user interface that may be used to search for a specific user ID. When the search results are returned it may display information about that specific user ID such as the form shown in FIG. 8A, or a list of possible users based on search match criteria. If one is selected then the user interface similar to FIG. 8 may be displayed. The user interface in FIG. 8A allows for modification of user information, for example the user information shown in 804 including name, first and last, phone, cell phone or a variety of phone numbers, email address or a variety of email addresses, knowledge-based questions and answers, the maximum number of certificates that can be associated with a user, and an a list 808 of fingerprinted user computing devices associated with a specific user.

Like in FIG. 7, as discussed, an administrator can, by either resetting all fingerprint registrations or resetting individual registrations via unchecking a box, as one example, revoke one or more user computing device registrations. For example, the authentication system 102 may support a user interface that could indicate to the authentication system a selection of one or more devices, and, based on that selection, disassociate the one or more selected devices with the user. In essence, revoking the device and forcing that device's user, if that device is ever used again, to re-register that device as an additional authentication factor. For example, if in FIG. 8 the reset all registrations button was sent by an administrator, that would cause the authentication system to execute a revocation of all devices associated with that user. This would cause all devices associated with that user to be re-registered if they are to be used as an additional authentication factor.

Figure 9A:
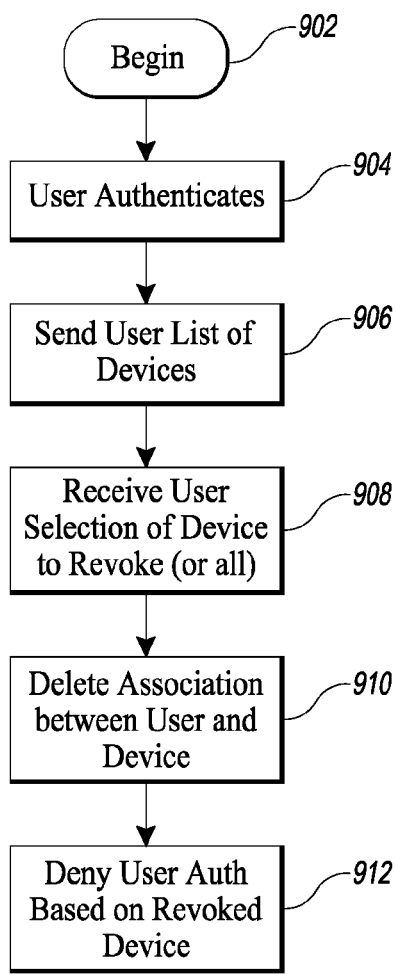
FIG. 9A is a flow diagram of an illustrative process for an authentication system to allow a user to manage or revoke their registered fingerprinted devices, as described in some embodiments.

FIG. 9A illustrates in one embodiment how a user may manage and/or revoke their devices. In FIG. 9A, a user may wish to revoke one or all of the devices associated with his account. In order to begin the process of managing his devices, the user may browse to the configuration web page via a link to the authentication system web server. The web server may require authentication of the user in order for that user to access the management web pages 904. User authentication this may be performed using any of the methods described herein including fingerprint device authentication, username and password authentication, one-time password authentication, certificate based authentication, or any of the other methods described herein, or those well known in the art, or are incorporated by reference.

Once the user authenticates, the authentication system will use the user ID that is associated with the authentication to retrieve the list of fingerprint devices. This may involve querying, based on user ID, the data store containing the associations registered devices.

In block 906 the authentication system may send to the user the list of retrieved devices as a part of a user interface to select and to initiate requests for revoking devices through the web. The user using the user computing device 110 may receive the list of devices and select one or more of the devices or indicate that all of the devices are to be revoked. This selection may then be sent via the web over the Internet or any local area or wide area network to the authentication system. The authentication system in block 908 will then receive the selection of device or devices to revoke including possibly all the devices to revoke. The authentication system may then delete the association between the user and the devices selected or all the devices if indicated to remove all the devices. Once that association is broken in block 912, the user will not be able to use the fingerprint or any of the fingerprint characteristics associated with the device to provide an additional authentication factor for enterprise applications unless the user once more goes through the registration process as described herein. Thus, in block 912, the user is denied future authentication based on the revoked device due to the revocation of the registration.

Figure 9B:
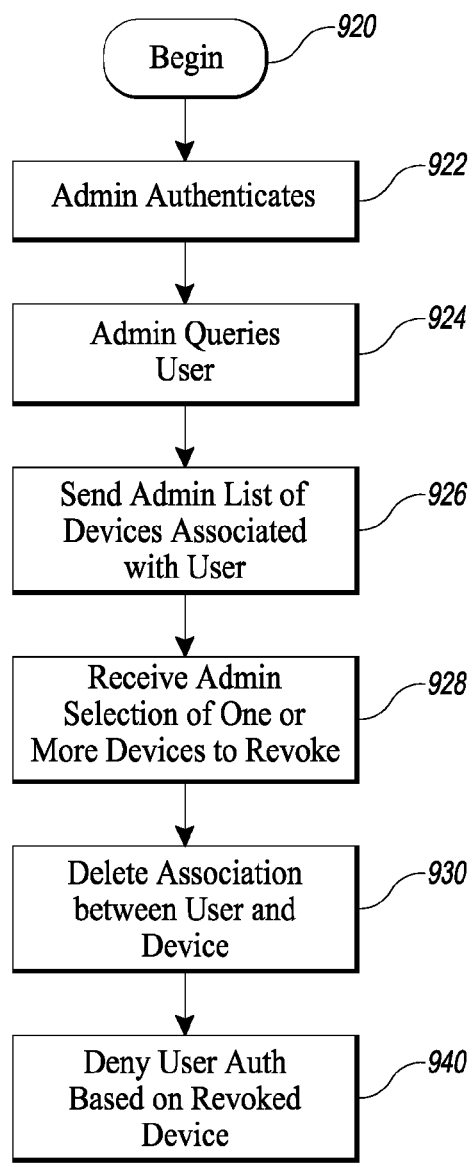
FIG. 9B is a flow diagram of an illustrative process for an authentication system to allow an administrator to manage or revoke a user's registered fingerprinted devices, as described in some embodiments.

FIG. 9B illustrates a method for an administrator to access the authentication system to search for a user and delete/ revoke associations between the searched for user, and one or more of the user's devices.

In block 922, the administrator authenticates using the same methods as described for block 904 for a user to authenticate. Unlike the user, the administrator's account may be indicated to have administrative rights above and beyond a normal user. This allows the administrator access to a set of web pages or functionality not normally authorized to a standard user, including querying other users and modifying the devices associated with those other user's accounts. Permission may be set up on a per enterprise basis, per user group basis, or any basis well known in the art. The administrator may then, such as by using the user interface described in FIG. 8, query the authentication system by typing in a user name, a partial user name, or any information associated with the user to search for a user. The authentication system may then perform the searching and return to the administrator a list of users to select. The administrator may then use the web server interface to select one of the users returned in the results and have the selection be sent back to the authentication system, upon which, in block 926, the authentication system may send to the administrator a list of devices associated with the selected user. An administrator may select one or more of the devices to revoke or may select all the devices to revoke in block 928. In block 930, upon receiving the selection of one or more devices or all devices to revoke, the authentication system may delete the association between the user and the device or devices. Once this is done, the user whose devices were deleted may not use those deleted devices for an additional authentication factor because they have been revoked. Instead, the user must re-register those devices using techniques described herein.

Auto-Updating of Device Fingerprint and Characteristic Matching

In some embodiments it may be advantageous to determine if two unrelated fingerprints are actually related. For example, a fingerprint as relating to the embodiments described herein represents a unique ID, based on a hash that is dependent on characteristics of the user computing device. However, if the user computing device changes one of those characteristics, the fingerprint may change. Although the characteristics may be mostly the same, the calculated hash may be represented as a different unique number, and thus it is unclear, based solely on the fingerprint, how many of the characteristics are the same, or whether the device is similar enough to a previously seen device already registered to the user. Therefore, it may be advantageous to implement a system that can detect any fingerprint changes, and update the fingerprints associated with the user. In the alternative it may be advantageous to determine that a device is new, and it is not an already registered device. Thus, a new device with a new fingerprint should be created.

In some embodiments, generally, there may be three basic scenarios. For example, during the authentication process, when the device characteristics are sent from the device and the hash is computed and compared to other hashes of registered devices of the user ID, in the first scenario, one of those fingerprint hashes is the same as the fingerprint hash just calculated. In this case, because of the hash match, it can be determined that there is no change in any device fingerprint, and this device is one of the user's registered devices.

In the second scenario, a device may have been changed but is, in fact, already registered. In this scenario, the calculated fingerprint hash for the changed device will be different from those of the registered devices. In this case, it may be desired to update the fingerprint and in addition, if it is determined that the device changed, re-authentication of an additional factor in addition to the fingerprint may, or may not be required (as configured).

In a third scenario, the devices may not be updated because the characteristics are significantly different from those characteristics stored for the other registered devices. In that case, additional authentication is required in order to register the current device as a new device associated with the user. In that case, a full registration must occur.

Thus, authentication system 102 may implement a concept, in some embodiments, of a "device accepting range" to give enterprises full control of device validation. The device acceptance range would allow devices to vary as they naturally evolve. A device acceptance range would also allow the enterprise administrator to manage this change according to the security requirements of his environment. For example, this device acceptance range can be set to be configured for different levels of acceptance. For example, the administrator can login and set in the authentication system an acceptance range on a per user basis, per enterprise basis, per user group basis, or any basis that may divide users of applications.

When the device fingerprint hashes matches one of the registered fingerprint hashes associated with the user ID, then the fingerprint does not need to be updated. Instead, authentication is confirmed by the additional fingerprinting factor, and authentication information may be sent through the user computing device 110 to the web application 103a requiring such additional authentication.

If the fingerprint does not match any of the fingerprints associated with the user ID, then a comparison may occur of each registered device's collected characteristics with the collected characteristics of the current user device that is seeking the additional authentication factor.

For example, the user ID has an association with all of its registered device's characteristics that were collected to calculate each registered device's fingerprint hash. The authentication system may compare the current characteristics, on a one-to-one basis, to those of the registered devices and calculated a "device certainty score." For example, it may compare the user-agent parameter for the registered device, to the user-agent parameter of the current device, and so on. The number of field matches out of the total number of matches may determine a match percentage of the subsequent authentication. For example, it may be a number between 0 and 100 where 100% match means all the characteristics matched on a one-to-one basis and the 0 match may mean that none of them matched. If the score was a 50, that would indicate that half of the characteristics matched. This is only one embodiment. Other scoring methods may be used. For example, certain characteristics may be more heavily weighted than other characteristics depending upon if those characteristics either are more frequently changed, and/or provide a more uniqueness than other characteristics. For example, the system may produce a low match score if a unique and infrequently changing characteristic was actually changed. This may indicate that, despite other characteristics being similar between two devices, the current device is actually a new device.

Once the device certainty score is determined, then a device acceptance range may be configured in the authentication system by the administrator. For example, there may be two ranges that may be used. One is a matched score. A match score may be a configurable setting that tells the authentication system what is the lowest level of device certainty score that can be matched before a new fingerprint/registration is required. For example, if the match score was 90% then if a match between the current device characteristics and a registered device's characteristics meets or exceeds 90%, then no new fingerprint may be computed, no new fingerprint is updated, and the authentication is considered a success. So the authentication system may return an authentication token indicating the additional factor was successful to the user computing device for forwarding to the web application server.

Another score, an update score, may be a configurable setting that tells the system the lowest level of device certainty score that is acceptable before the authentication system will trigger a user to re-register a device. For example, if the update score is set to 80%, then any device certainty score equal to or exceeding 80% may cause the authentication system to update the hash value and device characteristics of the matched registered user computing device. In other words, the system has interpreted that the user computing device is the same as one previously registered but has been changed slightly. Therefore, the fingerprint hash value should be updated and the characteristics should be updated in the table or tables that associated these characteristics and hash values with the user ID.

In some embodiments, the match score and update score may be combined and used at the same time. For example, if the match score is set to 90% and the update score is set to 80% then any score that has a match between 90 and 100 would be considered a match and no fingerprint would be updated. Any score between 80 and up to 90, but not including 90, may be considered an update. In this case the registered device is considered to have changed and new updated fingerprint hash values and device characteristics may be stored. In this manner, devices may be allowed to be updated and evolved without the system having to recreate a new device every time.

This updating system may lower registration frustration for a user when their device changes often, and prevent further headaches for users who frequently modify their devices. This may also prevent device registrations from becoming obsolete. In other words, if the same device was inserted into the authentication system's registration tables multiple times because it has slowly changed over time, this may cause wasted data to be stored and actually create orphan devices in the master data table. The master data table may store, for example, the associations of the user ID to its registered devices.

In some embodiments, the update score may indicate that a few characteristics have changed, but in addition to updating the characteristics of the user device in the fingerprint table, the authentication system will conduct a secure second factor of authentication prior to updating. In other words, the system may be configurable to either require additional authentication if the update score is met or not require additional authentication if the update score is met.

For example, a user may select to register his Windows 7 desktop for the first time. Before he returns to the same web application that is requiring the same additional authentication factor, he goes through a major device upgrade, and includes additional browser plugins and system modifications. During his next usage of the web application that redirects him to the authentication system, the authentication system would recognize that the device is the same but the fingerprinting would reflect a variation. For example, his device may have met the update score, but did not exceed the match score. In this case, the user, in some embodiments, would be forced to re-authenticate using a second factor of authentication such as a one-time password, etc. but his list of devices would only show one device enrolled to the user.

Figure 10:
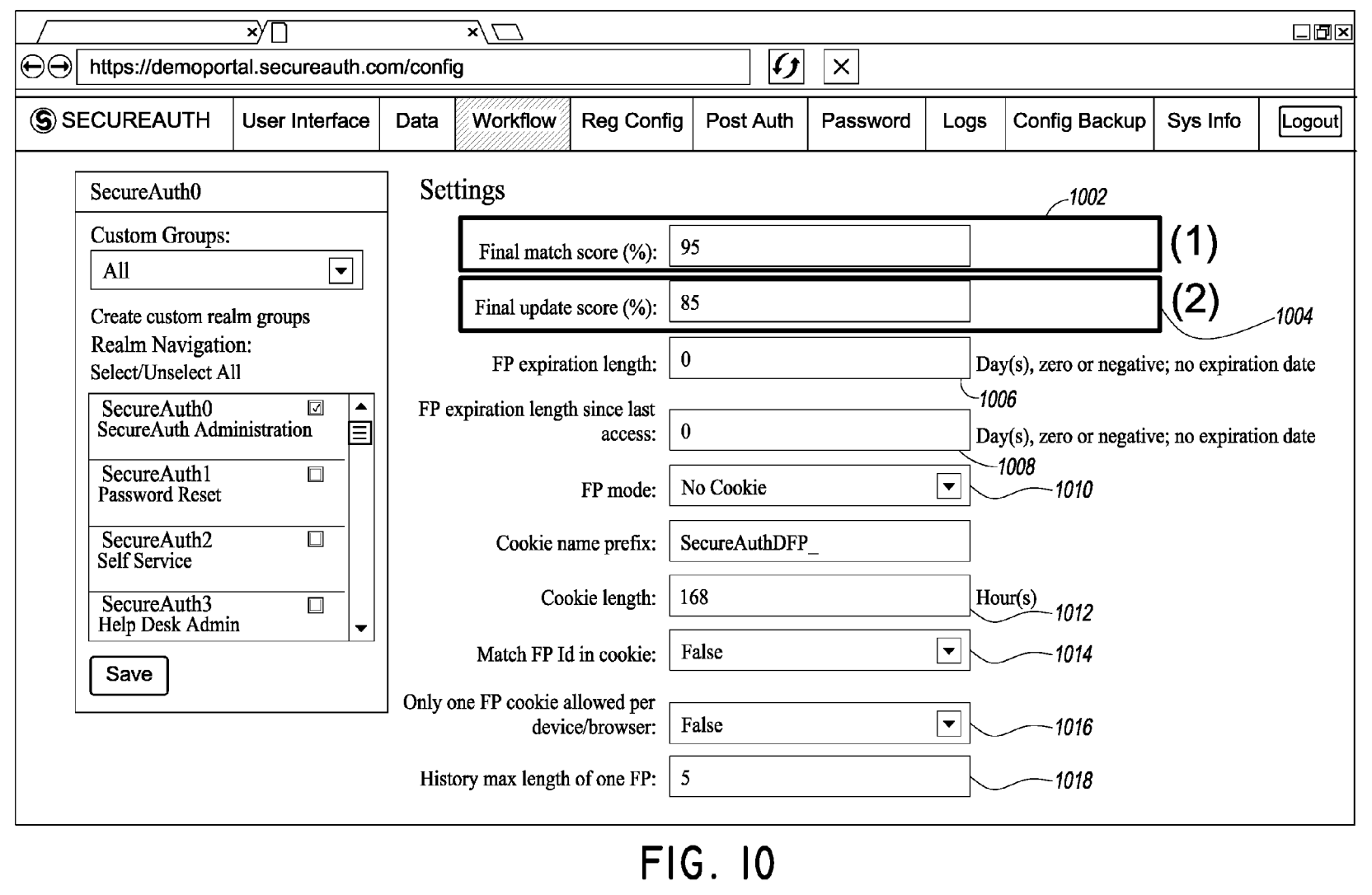

FIG. 10 illustrates a sample user interface that may be deployed, for example, via the web, by the authentication system 102 to configure how the device certainty score, update score and match scores may work and what levels they may be set at. For example, form input 1002 represents the input of a final match score. In this case the administrator has inserted 95, as in a 95% match must occur in order to ignore a mismatch between fingerprint hashes, and to successfully send an authentication token in lieu of any additional factor of authentication.

In form input 1004, an update score of 85 may be entered. This would indicate that if there is an 85% match then, although the user may have to re-authenticate using an additional factor, the registered device will be updated with the new fingerprint hash, and a corresponding record of the updated device's collected characteristics, in association with the user.

If the device certainty score is less than 85, then the user will have to provide an additional authentication factor before any successful authentication token may be generated. In addition, once authenticated, an authentication token may be generated and sent back to the user device and the web application requiring it. Additionally, a new registration will be entered into the authentication system's storage. For example, a new device may be stored in the association with the user using the current fingerprint hash and current fingerprinting characteristics that are unique to the device.

Other options are also available in the configuration of the fingerprinting mechanisms which may be implemented by the authentication system 102. For example, in field 1006, the administrator may specify a length of time to store the fingerprint. For example, if 0, there is no expiration date. If more than 0, then that would be the length of time in days that all fingerprints would expire. In some embodiments this means the length of time that a fingerprint would expire if not seen within that period of time. In other embodiments it may mean that the fingerprints would expire regardless of whether they have been reused within a certain period of time.

In form input 1008, the fingerprint expiration length since last access may be specified. This value may instruct the authentication system to unregister a fingerprint if that fingerprint has not been used within a certain amount of time. In form input 1010, a mode may be specified for fingerprinting. For example, a cookie may be used to store the fingerprint directly on the user computing device (like a stored fingerprint cache). On the other hand, no cookie may be used and the fingerprints may be calculated every time there is an access. Other cookie parameters may also be calculated such as the name prefix of the cookie and the cookie length in box 1012. This length would be the number of hours before the fingerprint/cookie expired on the user computing device. In form input 1014, the fingerprints may be configured to require a match between a cookie and a calculated fingerprint. If unsuccessful then re-registration may be required if this feature is turned on.

In form input 1016 another feature may be configured that mandates only one fingerprint cookie allowed per device or browser instead of multiple fingerprint cookies. If this is enforced, a new fingerprint cookie would replace a previous cookie that has a different hash value. In form input 1018, the maximum length of fingerprints recorded by the authentication system may be specified, for example in order to limit how much history can be stored and registered for a particular user. If a user exceeds the maximum number of devices that may be registered to it, then the older devices in some embodiments may be removed when a new device is registered. Just as administrators can set preferences for all individual users on the authentication system, administrators may also set preferences on a per authentication realm basis. These preferences may also establish the distinct requirements for individual applications, such as a web application, or individual requirements for a certain authentication realm. For example, if Google deployed this system as a cloud service, then certain configuration preferences may be applicable only to google.com domains, and not to, for example, oracle.com domains.

Figure 11:
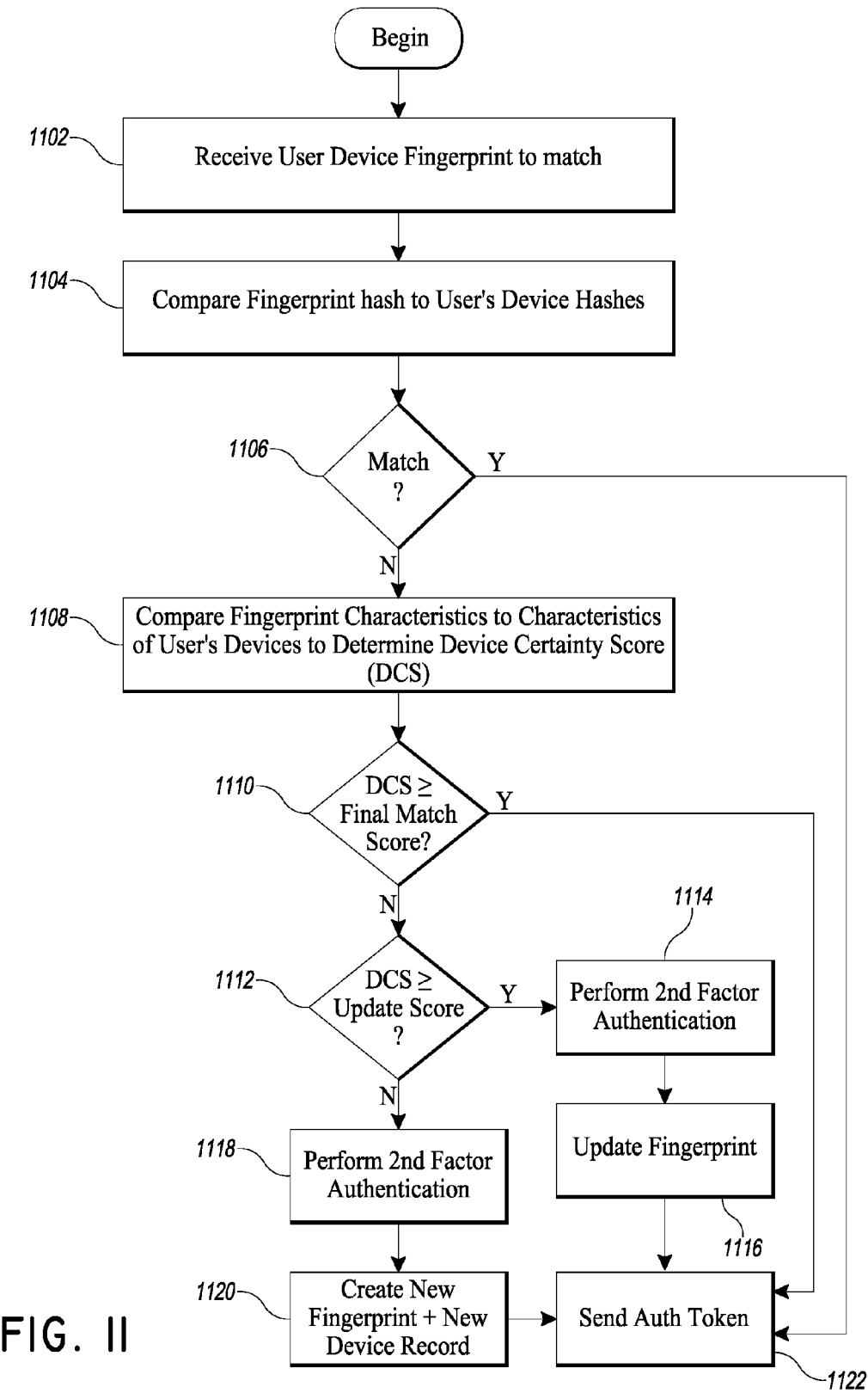
FIG. 11 is a flow diagram of illustrative processes, communications and data flows to determine whether to accept a fingerprint as valid and/or determine whether to update a fingerprint, as described in some embodiments.

FIG. 11 is a flow chart illustrating how some embodiments implement the decision certainty score decisions.

FIG. 11 illustrates a flow chart of the decision score algorithm in comparison to the match score and update score, and whether a second factor of authentication may be required in some embodiments, depending on decision certainty score. In block 1102, the user device 110 may send the characteristics requested by the authentication system in the collection script. The authentication system 102 may then compute the fingerprint based on these characteristics of the current device for comparison. In block 1104, the fingerprint hash may be compared to other devices registered to the user by querying all devices registered to the user's ID, and comparing each device's hash to the current calculated hash of the user computing device. In block 1106, if there is a match, then an authentication token may be sent. If there is not a match, then each of the fingerprint characteristics of the current user computing device may be compared to the characteristics of the registered devices to determine a device certainty score. This comparison may result in a percentage based device certainty score of characteristics that are matched out of the total of characteristic types compared. In block 1110 if the device certainty score is greater than or equal to the final match score then the authentication is considered successful and an authentication token may be sent to the user device. This token may indicate that an additional factor of authentication was performed and was a success. This success and the sending of the authentication token is reflected in block 1122.

However, if the decision certainty score is less than or equal to the match score, then in block 1112, the decision certainty score may be compared to the update score. If the decision certainty score is greater than or equal to the update score, then an additional factor of authentication may be performed. For example, a one-time password, proof of the user via certificate and digital signature, or any other additional authentication method including knowledge based questions and answers. If this is authentication is successful, the fingerprint may be updated. For example, the registered device that was compared to the current user device may be updated with the current user device characteristics and that device's fingerprint hash may be updated with the current fingerprint hash in the table that associates the user ID to the registered device in block 1116. Then, in block 1122, an authentication token may be sent from the authentication system to the user computing device to indicate that the additional authentication was a success.

However, in block 1112, if the decision certainty score is less than or equal to the update score, then again, a second factor of authentication must be performed in block 1118. However, if successful, this would create a new fingerprint and new device registered in association with the user in block 1120. The authentication system would store the user ID in association with the current user computing device's fingerprint hash and fingerprint characteristics. After which the authentication token may be sent in block 1122.

Although the embodiments above described using the system and methods herein with web data and web page data, the same authentication principles may be used for other types of applications including standalone desktop applications, such as a network application like Microsoft Outlook, or may be used on mobile devices, for example, mobile device app such as an iPhone app may be redirected by a network service to authenticate an additional factor with the authentication system. This mobile application may communicate with the authentication system and may collect statistics or characteristics of the mobile device similar to the browser. Alternatively, this mobile application as described in applications incorporated by reference herein may use a browser to negotiate the authentication token to be consumed and sent to the network service attempted to being accessed by the mobile application. In either scenario, the mobile application may send characteristics to the authentication system to be fingerprinted by the authentication system, and be stored for future use. Thus, when the mobile application is used in the future, the additional authentication factor such as certificate based authentication, one-time passwords, knowledge based authentication, YUBI key, or USB key based authentication, need not be performed—and instead the fingerprint can be used in lieu of these additional factors of authentication as described herein.

Implementation Mechanisms

Figure 12:
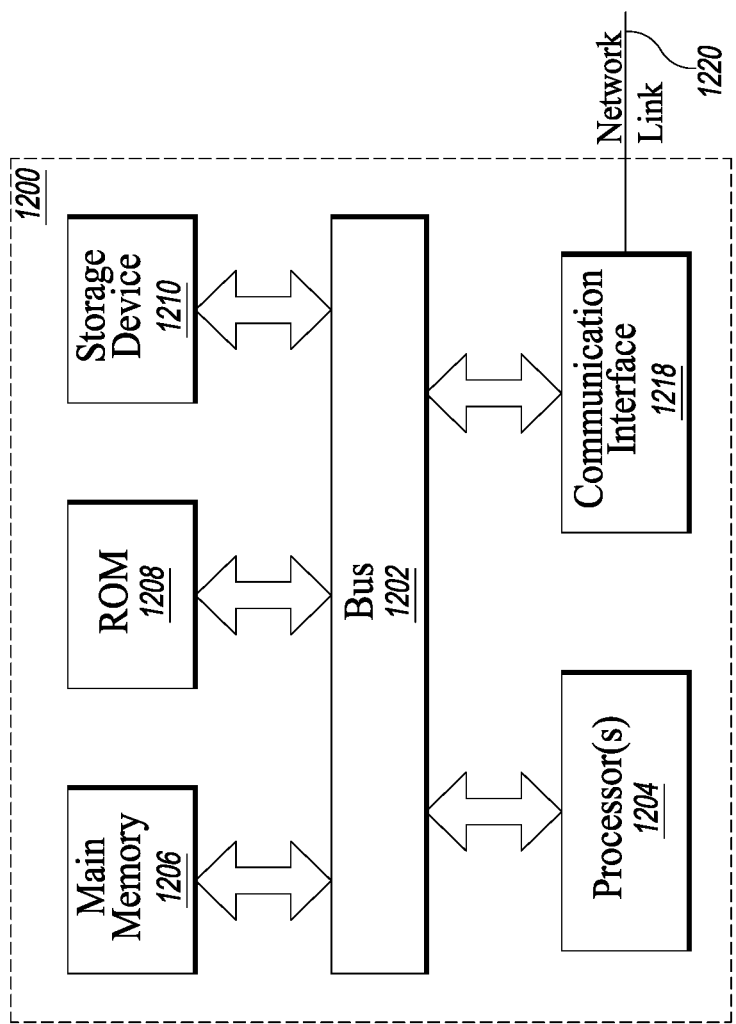
FIG. 12 illustrates a network environment and computer systems and devices with which various methods and systems discussed herein may be implemented, according to various embodiments of the present disclosure.

FIG. 12 is a block diagram that illustrates a computer system 1200 upon which the various systems, devices, and/or methods discussed herein may be implemented. For example, some or all aspects of computing system 1200 may be included in any of web server 103a, app server 103n, user computing devices 110, and authentication system 102. Computer system 1200 includes a bus 1202 or other communication mechanism for communicating information, and a hardware processor, or multiple hardware processors, 1204 coupled with bus 1202 for processing information. Hardware processor(s) 1204 may be, for example, one or more general purpose microprocessors.

Computer system 1200 also includes a main memory 1206, such as a random access memory (RAM), cache and/or other dynamic storage devices, coupled to bus 1202 for storing information and instructions to be executed by processor 1204. Main memory 1206 also may be used for storing temporary variables or other intermediate information during execution of instructions to be executed by processor 1204. Such instructions, when stored in storage media accessible to processor 1204, render computer system 1200 into a special-purpose machine that is customized to perform the operations specified in the instructions.

Computer system 1200 further includes a read only memory (ROM) 1208 or other static storage device coupled to bus 1202 for storing static information and instructions for processor 1204. A storage device 1210, such as a magnetic disk, optical disk, or USB thumb drive (Flash drive), etc., is provided and coupled to bus 1202 for storing information and instructions.

Computing system 1200 may include modules configured to perform the authentication processes described herein. These modules may be stored in a mass storage device as executable software codes that are executed by the computing device(s). This and other modules may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

In general, the word "module," as used herein, refers to logic embodied in hardware or firmware, or to a collection of software instructions, possibly having entry and exit points, written in a programming language, such as, for example, Java, Lua, C or C++. A software module may be compiled and linked into an executable program, installed in a dynamic link library, or may be written in an interpreted programming language such as, for example, BASIC, Perl, or Python. It will be appreciated that software modules may be callable from other modules or from themselves, and/or may be invoked in response to detected events or interrupts. Software modules configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware modules may be comprised of connected logic units, such as gates and flip-flops, and/or may be comprised of programmable units, such as programmable gate arrays or processors. The modules or computing device functionality described herein are preferably implemented as software modules, but may be represented in hardware or firmware. Generally, the modules described herein refer to logical modules that may be combined with other modules or divided into sub-modules despite their physical organization or storage Computer system 1200 may implement the techniques described herein using customized hard-wired logic, one or more ASICs or FPGAs, firmware and/or program logic which in combination with the computer system causes or programs computer system 1200 to be a special-purpose machine. According to one embodiment, the techniques herein are performed by computer system 1200 in response to processor(s) 1204 executing one or more sequences of one or more modules and/or instructions contained in main memory 1206. Such instructions may be read into main memory 1206 from another storage medium, such as storage device 1210. Execution of the sequences of instructions contained in main memory 1206 causes processor(s) 1204 to perform the process steps described herein. In alternative embodiments, hard-wired circuitry may be used in place of or in combination with software instructions.

The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 1210. Volatile media includes dynamic memory, such as main memory 1206. Common forms of non-transitory media include, for example, hard disk, solid state drive, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between nontransitory media. For example, transmission media includes coaxial cables, copper wire, and fiber optics, including the wires that comprise bus 1202. Transmission media can also take the form of acoustic or light waves, such as those generated during radio-wave and infra-red data communications.

Various forms of media may be involved in carrying one or more sequences of one or more instructions to processor 1204 for execution. For example, the instructions may initially be carried on a magnetic disk or solid state drive of a remote computer. The remote computer can load the instructions and/or modules into its dynamic memory and send the instructions over a telephone line using a modem. A modem local to computer system 1200 can receive the data on the telephone line and use an infra-red transmitter to convert the data to an infra-red signal. An infra-red detector can receive the data carried in the infra-red signal and appropriate circuitry can place the data on bus 1202. Bus 1202 carries the data to main memory 1206, from which processor 1204 retrieves and executes the instructions. The instructions received by main memory 1206 may optionally be stored on storage device 1210 either before or after execution by processor 1204.

Computer system 1200 also includes a communication interface 1218 coupled to bus 1202. Communication interface 1218 provides a two-way data communication coupling to a network link 1220 that may be connected to any other interface and/or network, for example network 120 of FIG. 1. For example, communication interface 1218 may be an Ethernet interface, integrated services digital network (ISDN) card, cable modem, satellite modem, or a modem to provide a data communication connection to a corresponding type of telephone line. As another example, communication interface 1218 may be a local area network (LAN) card to provide a data communication connection to a compatible LAN (or WAN component to communicate with a WAN). Wireless links, such as 802.11 or microwave, may also be implemented. In any such implementation, communication interface 1218 sends and receives electrical, electromagnetic, or optical signals that carry digital data streams representing various types of information.

Network link 1220 typically provides data communication through one or more networks to other data devices. For example, network link 1220 may provide a connection through one or more local or non-local networks to host computers or other data equipment operated by an Internet Service Provider (ISP).

In an embodiment, the network link 1220 may provide data communication services through the world wide packet data communication network now commonly referred to as the "Internet." Communication may be accomplished through the user of, for example, electrical, electromagnetic, and/or optical signals that carry digital data streams. The signals through the various networks and the signals on network link 1220 and through communication interface 1218, which carry the digital data to and from computer system 1200, are example forms of transmission media.

Computer system 1200 may send messages and/or receive data, including program code, through the network(s), network link 1220 and communication interface 1218. In the Internet example, a server or other computer-enabled device or system may transmit a requested code for an application program through one or more networks and/or communication interface 1218.

Each of the processes, methods, and algorithms described in the preceding sections may be embodied in, and fully or partially automated by, code modules executed by one or more computer systems or computer processors comprising computer hardware. The processes and algorithms may be implemented partially or wholly in application-specific circuitry.

The various features and processes described above may be used independently of one another, or may be combined in various ways. All possible combinations and subcombinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

Conditional language, such as, among others, "can," "could," "might," or "may," unless specifically stated otherwise, or otherwise understood within the context as used, is generally intended to convey that certain embodiments include, while other embodiments do not include, certain features, elements, and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

The term "comprising" as used herein should be given an inclusive rather than exclusive interpretation. For example, a general purpose computer comprising one or more processors should not be interpreted as excluding other computer components, and may possibly include such components as memory, input/output devices, and/or network interfaces, among others.

Any process descriptions, elements, or blocks in the flow diagrams described herein and/or depicted in the attached figures should be understood as potentially representing modules, segments, or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art.

It should be emphasized that many variations and modifications may be made to the above-described embodiments, the elements of which are to be understood as being among other acceptable examples. All such modifications and variations are intended to be included herein within the scope of this disclosure. The foregoing description details certain embodiments of the invention. It will be appreciated, however, that no matter how detailed the foregoing appears in text, the invention can be practiced in many ways. As is also stated above, it should be noted that the use of particular terminology when describing certain features or aspects of the invention should not be taken to imply that the terminology is being re-defined herein to be restricted to including any specific characteristics of the features or aspects of the invention with which that terminology is associated. The scope of the invention should therefore be construed in accordance with the appended claims and any equivalents thereof.

What is claimed is:

1. An authentication method comprising, by execution of program instructions by an authentication system:
   maintaining a data repository that stores, for each of a plurality of registered user devices associated with a user account, a respective set of device attribute values, each set comprising values of a plurality of device attributes of the respective registered user device;
   transmitting capture instructions over a network to an authenticating user device attempting to authenticate in association with the user account, wherein the capture instructions instruct the authenticating user device to generate and return device attribute values of the plurality of device attributes of the authenticating user device;
   receiving a set of device attribute values of the authenticating user device, said set of device attribute values of the authenticating user device generated and returned by the authenticating user device in response to execution of the capture instructions;
   determining that the set of device attribute values of the authenticating user device does not match any set of device attribute values of the plurality of registered user devices associated with the user account;
   generating a score representing a degree of match between the set of device attribute values of the authenticating user device and the set of device attribute values of a first of the plurality of registered user devices, the degree of match being less than 100%; and
   based at least partly on the score, performing an additional level of authentication of the authenticating user device; and
   in response to determining that the score satisfies an update threshold, updating the data repository to reflect a change in the set of device attribute values of the first registered user device.

2. The authentication method of claim 1, wherein determining that the returned set of device attribute values does not match any set of device attribute values of the plurality of registered user devices comprises:
   generating a hash of the set of device attribute values of the authenticating user device; and
   for each registered user device, comparing the hash to a hash of the set of device attribute values of the respective registered user device.

3. The authentication method of claim 1, wherein the method comprises generating, for each of multiple registered user devices associated with the user account, a respective score representing a degree of match between the set of device attribute values of the authenticating user device and the set of device attribute values of the respective registered user device, and using the plurality of scores to determine whether to perform the additional level of authentication of the authenticating user device.

4. The authentication method of claim 1, wherein the capture instructions are transmitted to the authenticating user device in response to verification of authentication information entered by a user on the user device.

5. The authentication method of claim 1, wherein the capture instructions are executed on the user device during authentication of the user device, such that the set of device attribute values represents attributes of the user device at a time of authentication of the user device.

6. The authentication method of claim 1, wherein the additional level of authentication comprises verification of a password sent to a user of the authenticating user device via an out-of-band channel.

7. The authentication method of claim 1, further comprising, when a determination is made to perform an additional level of authentication, transmitting to a user of the authenticating user device, via an out-of-band channel, a one-time password to enter on the authenticating user device.

8. The authentication method of claim 1, wherein the capture instructions are configured to query a plurality of components of the authenticating user device, during authentication of the authenticating user device, to obtain the set of device attribute values.

9. An authentication system, comprising:
a data repository that stores, for each of a plurality of registered user devices associated with a user account, a respective set of device attribute values, each set comprising values of a plurality of device attributes of the respective registered user device;
a computer system comprising one or more processors, the computer system programmed with executable program instructions to implement an authentication process that comprises:
transmitting capture instructions over a network to an authenticating user device attempting to authenticate in association with the user account, wherein the capture instructions instruct the authenticating user device to generate and return device attribute values of the plurality of device attributes of the authenticating user device;
receiving a set of device attribute values of the authenticating user device, said set of device attribute values of the authenticating user device generated and returned by the authenticating user device in response to execution of the capture instructions;
determining that the set of device attribute values of the authenticating user device does not match any set of device attribute values of the plurality of registered user devices associated with the user account;
generating a score representing a degree of match between the set of device attribute values of the authenticating user device and the set of device attribute values of a first of the plurality of registered user devices, the degree of match being less than 100%;
based at least partly on the score, performing an additional level of authentication of the authenticating user device; and
in response to determining that the score satisfies an update threshold, updating the data repository to reflect a change in the set of device attribute values of the first registered user device.

10. The authentication system of claim 9, wherein the capture instructions are executed on the user device during authentication of the user device, such that the set of device attribute values represents attributes of the user device at a time of authentication of the user device.

11. The authentication system of claim 9, wherein the additional level of authentication comprises verification of a password sent to a user of the authenticating user device via an out-of-band channel.

12. The authentication system of claim 9, wherein the authentication process further comprises, when a determination is made to perform an additional level of authentication, transmitting to a user of the authenticating user device, via an out-of-band channel, a one-time password to enter on the authenticating user device.

13. The authentication system of claim 9, wherein the capture instructions are configured to query a plurality of components of the authenticating user device during the authentication process to obtain the set of device attribute values.

14. The authentication system of claim 9, wherein the computer system is programmed to transmit the capture instructions to the authenticating user device in response to verification of authentication information entered by a user on the user device.

15. The authentication system of claim 9, wherein the computer system determines that the returned set of device attribute values does not match any set of device attribute values of the plurality of registered user devices by a process that comprises:
generating a hash of the set of device attribute values of the authenticating user device; and
for each registered user device, comparing the hash to a hash of the set of device attribute values of the respective registered user device.

16. The authentication system of claim 9, wherein the process comprises generating, for each of multiple registered user devices associated with the user account, a respective score representing a degree of match between the set of device attribute values of the authenticating user device and the set of device attribute values of the respective registered user device, and using the plurality of scores to determine whether to perform the additional level of authentication of the authenticating user device.

* * * * *